United States Patent
Anderson et al.

(10) Patent No.: US 11,156,855 B2
(45) Date of Patent: Oct. 26, 2021

(54) MODULAR WEARABLE ELECTRONIC DEVICES, SYSTEMS, AND METHODS

(71) Applicant: Oakley, Inc., Foothill Ranch, CA (US)

(72) Inventors: Christopher John Anderson, Mission Viejo, CA (US); Benjamin John Meunier, San Clemente, CA (US); Ryan Neil Saylor, Mission Viejo, CA (US); Timothy James Wilde, South Lebanon, OH (US)

(73) Assignee: Oakley, Inc., Foothill Ranch (CA)

( * ) Notice: Subject to any disclaimer, the term of this patent is extended or adjusted under 35 U.S.C. 154(b) by 130 days.

(21) Appl. No.: 16/088,767

(22) PCT Filed: May 9, 2016

(86) PCT No.: PCT/US2016/031427
§ 371 (c)(1),
(2) Date: Sep. 26, 2018

(87) PCT Pub. No.: WO2017/196294
PCT Pub. Date: Nov. 16, 2017

(65) Prior Publication Data
US 2019/0113774 A1   Apr. 18, 2019

(51) Int. Cl.
*G02C 11/00* (2006.01)
*H04B 1/3827* (2015.01)
(Continued)

(52) U.S. Cl.
CPC ............ *G02C 11/10* (2013.01); *G02B 27/017* (2013.01); *G02C 5/143* (2013.01); *G02C 11/06* (2013.01);
(Continued)

(58) Field of Classification Search
CPC . G02C 1/00; G02C 5/14; G02C 5/143; G02C 11/00; G02C 11/06; G02C 11/10;
(Continued)

(56) References Cited

U.S. PATENT DOCUMENTS 5,606,743 A * 2/1997 Vogt ....................... H04B 1/086
16/228
8,159,402 B2   4/2012 Alameh et al.
(Continued)

FOREIGN PATENT DOCUMENTS

WO   WO2013/188343   12/2013
WO   WO-2015/166345 A2   11/2015

OTHER PUBLICATIONS

Skyzone SKY01 FPV Video Goggles w/ 5.8GHz Dual Diversity 32-CH Receiver—Black, DX.com, Retreived via Internet Archive Wayback Machine (Archived Jul. 23, 2014).
(Continued)

*Primary Examiner* — Blane J Jackson
(74) *Attorney, Agent, or Firm* — Sterne, Kessler, Goldstein & Fox P.L.L.C.

(57) ABSTRACT

A modular, wearable electronic system is disclosed. The modular, wearable electronic system can include an eyewear unit which can be worn on a user's head and one or more modular units which can removably couple with the eyewear unit via one or more ports and/or connectors. The eyewear unit and the modular unit can communicate with each other via the port or connector to which the eyewear unit and the modular unit are coupled. The modular units can supplement the functionality of the eyewear unit.

24 Claims, 11 Drawing Sheets

(51) Int. Cl.
G02C 5/14 (2006.01)
G02C 11/06 (2006.01)
G02B 27/01 (2006.01)
H04W 4/80 (2018.01)

(52) U.S. Cl.
CPC ............... G02B 2027/014 (2013.01); G02B 2027/0178 (2013.01); G02C 2200/08 (2013.01); H04W 4/80 (2018.02)

(58) Field of Classification Search
CPC .. H04B 1/38; H04B 1/385; H04B 2001/3866; H04B 1/3827; H04B 1/3888; G02B 27/014
See application file for complete search history.

(56) References Cited

U.S. PATENT DOCUMENTS

| | | | | |
|---|---|---|---|---|
| 9,024,830 | B2 | 5/2015 | Okajima et al. | |
| 10,286,163 | B1* | 5/2019 | Paustian | A61M 15/0003 |
| 10,310,296 | B2* | 6/2019 | Howell | G02C 11/10 |
| 2004/0215958 | A1 | 10/2004 | Ellis et al. | |
| 2007/0030442 | A1* | 2/2007 | Howell | G02C 11/10 351/158 |
| 2007/0046887 | A1* | 3/2007 | Howell | G02C 11/10 351/41 |
| 2008/0143954 | A1* | 6/2008 | Abreu | H04N 7/185 351/158 |
| 2009/0156128 | A1* | 6/2009 | Franson | H04N 5/38 455/66.1 |
| 2012/0169990 | A1* | 7/2012 | Burnstein | A43B 3/001 351/115 |
| 2013/0265169 | A1 | 10/2013 | Mates | |
| 2013/0329183 | A1* | 12/2013 | Blum | G06F 3/011 351/158 |
| 2014/0273893 | A1 | 9/2014 | Katayama | |
| 2014/0354494 | A1 | 12/2014 | Katz | |

OTHER PUBLICATIONS

Tokyo Otaku Mode News, "Now You Can Own Conan's Beloved Criminal Tracking Glasses from 'Detective Conan'!" Oct. 2, 2015, https://otakumode.com/news/560bbe3f2cfa09ed13a74a07.

* cited by examiner

MODULAR WEARABLE ELECTRONIC DEVICES, SYSTEMS, AND METHODS

BACKGROUND

Field

The embodiments described herein relate generally to wearable electronic communication devices, systems, and methods. In particular, some embodiments described herein relate to wearable electronic communication devices and systems that can be placed on a user's head, such as eyewear.

Background

There are numerous situations in which it is convenient and preferable to include electronic communication features and functionality on devices and systems worn on a user's body, such as on a wearer's head. Many such devices and systems can convey signals to and receive signals from the user in a hands-free manner. As a result, the user can receive and/or send signals, such as audio and/or visual signals, in a convenient manner while focusing on other tasks.

However, advances and improvements in devices and systems with electronic communication features have been occurring at an extremely rapid pace. For example, processors have become more powerful and efficient, larger amounts of memory can be stored in a smaller space, new communication protocols have been developed which can provide significant advantages over older communication protocols, etc. As a result, older devices and systems can quickly become incompatible or antiquated within a short span of time, thereby requiring a user to purchase newer devices and systems on a frequent basis to remain up-to-date with respect to hardware and programs. This can present a problem to many users since such devices and systems may require elaborate and expensive components and systems to enable highly sophisticated functional communication features. Moreover, users are often interested in only a subset of new or enhanced features and functionality.

SUMMARY

Accordingly, there is a need for improved wearable electronic communication devices and systems. The electronic device or system can be provided with removably attachable interchangeable components, such as modular units, to supplement the capabilities of another component, such as a base unit including, but not limited to, a headworn wearable unit. The headworn wearable unit can be, for example, an eyewear such as an eyeglass frame or a goggle frame, either with or without lenses. The headworn wearable unit can be, as another example, a helmet. The electronic device or system can be contained in a housing that can be associated within a personal area network range of the wearer.

In some embodiments, an electronic system is provided with removably attachable interchangeable components, such as modular units, to supplement the capabilities of another component, such as an eyewear unit. The eyewear unit can include one or more components contained therein. For example, the eyewear unit can include a processor and memory for processing and storing data. The eyewear unit can include one or more sensors to obtain sensory data related to the environment, the user, and/or motion of the eyewear unit. To communicate with other devices, the eyewear unit can include components such as a receiver and transmitter (or transceiver) to enable wireless communication with other devices and/or a port or connector for wired communication with other devices. For example, a modular unit can be removably coupled to the eyewear unit via the port or connector. The modular unit can include components such as, but not limited to, a speaker and an ambient or biometric sensor. The modular unit can include other features to supplement the capabilities of the eyewear unit.

In some embodiments, an electronic system can include an eyewear unit configured to be worn on a user's head. The eyewear unit can include an input/output system which includes at least one wired connection, such as a port and/or connector. The electronic system can include a modular unit. The modular unit can include an input/output system which includes at least one wired connection, such as a port and/or connector. The modular unit can also include at least one of the following components: a processor, a memory, a sensor, a receiver configured to wirelessly communicate with at least one remote unit, a transmitter configured to wirelessly communicate with at least one remote unit, and a transceiver configured to wirelessly communicate with at least one remote unit. The input/output systems of the eyewear unit and the modular unit can provide a wired electrical connection between the eyewear unit and the modular unit when in a coupled configuration via the at least one wired connection the eyewear unit and the at least one wired connection of the modular unit.

In some embodiments, an electronic system can include an eyewear unit configured to be worn on a user's head. The eyewear unit can include an input/output system including at least one wired connection, such as a port and/or connector. The electronic system can also include modular unit. The modular unit can include an input/output system including at least one wired connection, such as a port and/or connector, configured to removably couple to the at least one wired connection of the eyewear unit. The at least one wired connection of the eyewear unit and the at least one wired connection of the modular unit can provide a wired electrical connection between the eyewear unit and the modular unit when in a coupled configuration. The input/output systems and the eyewear unit and the modular unit can provide communication (e.g., the eyewear unit can transfer data to the modular unit and the modular unit can transfer data to the eyewear unit) between the eyewear unit and the modular unit via the coupled wired connections of the eyewear unit and the modular unit.

In some embodiments, the modular unit can include a second wired connection, wherein at least the second wired connection is configured to connect the modular unit to another modular unit. The input/output system of the modular unit can be configured to provide communication between the eyewear unit and the second unit modular unit (e.g., the eyewear unit can transfer data to the second modular unit and the second modular unit can transfer data to the eyewear unit). In some embodiments, the eyewear unit can include a power source configured to power the modular unit. The power source can provide power to the second modular unit via the coupled port and connector of the eyewear and the modular unit.

In some embodiments, an electronic system can include an eyewear unit and/or one or more modular units which are mechanically attached to and/or carried by the eyewear unit. The eyewear unit and/or modular unit can serve as the central hub or node for multiple source devices in the form of remote units which are not carried by the eyewear unit (e.g., rather than a smart phone or some other mobile electronic device serving as the central hub or node).

In some embodiments, the modular unit can include an input/output system. The input/output system can include a receiver and a transmitter configured to wirelessly communicate with at least one remote unit. In some embodiments, the at least one remote unit can include a sensor. In some embodiments, the at least one remote unit can include a smart phone.

In some embodiments, the modular unit can be configured to be attached to the eyewear unit proximate the user's head. In some embodiments, the receiver of the modular unit can include two or more wireless protocols, for example Bluetooth, Bluetooth Low Energy (Bluetooth Smart), ANT, ANT+, ZigBee, Wi-Fi, GSM, CDMA, MMS, similar protocols, and other protocols which may be developed. A receiver of any eyewear unit may include one or more of these protocols. In some embodiments, the eyewear unit and/or modular unit can communicate with a remote unit having a first wireless protocol and a remote unit having a second wireless protocol. In some embodiments, an electronic system can include an eyewear unit, a modular unit, and an input/output system. The eyewear unit can be worn on a user's head and can include at least one port or connector. The modular unit can include a connector and/or a port, the connector and/or the port being configured to removably couple to the complimentary port or connector of the eyewear unit. The coupled port and connector of the eyewear and the modular unit can be configured to provide a wired electrical connection between the eyewear unit and the modular unit. The input/out system can be configured to provide communication between the eyewear unit and the modular unit via the coupled port and connector of the eyewear and the modular unit (e.g., the eyewear unit can transfer data to the modular unit and the modular unit can transfer data to the eyewear unit).

In some embodiments, the eyewear unit can include at least one of the following components: a processor, a memory, a sensor, a receiver configured to wirelessly communicate with at least one remote unit, and a transmitter configured to wirelessly communicate with at least one remote unit. In some embodiments, the modular unit can include at least one of the following components: a processor, a memory, a sensor, a receiver configured to wirelessly communicate with at least one remote unit, and a transmitter configured to wirelessly communicate with at least one remote unit.

In some embodiments, the eyewear unit can include a processor and the modular unit can include a receiver and a transmitter. In some embodiments, the eyewear unit can include a processor and the modular unit can include a bone-conduction speaker. One or more source devices, such as a modular unit or a remote unit, can be devices for generating a signal indicative of any one or more of environmental information, biometric information, entertainment, and/or other information, including, but not limited to, an accelerometer, gyroscope, proximity sensor, temperature, humidity, altitude, barometric pressure, GPS, wind sensor, music, video, text-to-voice capabilities, and/or interpersonal communication. Source devices can also capture biometric data for transmission to the electronic device, such as body temperature, blood pressure, respiration characteristics including, but not limited to, rate and tidal volume, blood or respiration $CO_2$, $pO_2$, lactic acid, heart rate, and dermal moisture. The output from any of the foregoing source devices can be transmitted to the wearer via visual display, audio output, haptic feedback, or a combination of these transmission mechanisms, depending upon the nature of the data and desired display format.

The source devices can be unique, discrete, single function devices or devices that can sense or determine two or three or more parameters in a single device. In some embodiments, one or two or three or more source devices can be removably mechanically attached to and/or carried by the electronic device or system, while one or more other source devices may be worn by the wearer or equipment (e.g., bicycle, treadmill, or other equipment) and associated with the wearer within a personal area network range so that they may be paired in communication with the electronic device or system.

In some embodiments, the electronic device or system comprises an eyeglass or goggle or helmet support structure, having onboard electronics such as a power source, CPU, transceiver for pairing with any Bluetooth, ANT, ANT+, or other wireless protocol source device, one or two or more electrical and/or mechanical ports or connectors, such as USB 3.0 ports or connectors, for removably receiving a complementary module having additional electronics.

In some embodiments, an electronic system is provided with one or two or more tactile feedback elements such as a haptic component. The system can include an eyewear unit wearable on a user's head with one or more components contained therein. For example, the eyewear unit can include a processor, memory, one or more sensors, and/or communication components such as a receiver, transmitter and/or port. The eyewear unit can include a haptic component designed to generate a tactile signal perceptible by the user.

In some embodiments, an electronic system can include an eyewear unit configured to be worn on a user's head. The eyewear unit can include at least one of a processor, a memory, a sensor, a receiver configured to wirelessly communicate with at least one remote unit, a transmitter configured to wirelessly communicate with at least one remote unit, and a wired connection. The eyewear unit can also include at least one haptic component configured to generate a tactile signal perceptible by the user.

In some embodiments, the at least one haptic component can include a piezoelectric actuator. In some embodiments, the at least one haptic component can provide a user with a tactile representation of data received from a sensor. In some embodiments, the at least one haptic component can provide a user with notifications of a trigger event. In some embodiments, the at least one haptic component can include two or more haptic components positioned on different regions of the eyewear unit. In some embodiments, the at least one haptic component can include a first haptic component positioned on a lateral region of the eyewear unit and a second haptic component positioned on an opposite lateral region of the eyewear unit. In some embodiments, the at least one haptic component can provide a user with navigation information. In some embodiments, a haptic component can be added to an existing eyewear unit via a modular unit and/or a remote unit.

In some embodiments, the system can include a visual component configured to display an image to the user. In some embodiments, the system can include an audio component configured to generate an audible signal perceptible by the user. In some embodiments, the system can include a haptic component configured to generate a tactile signal perceptible by the user. In some embodiments, the eyewear unit can include a sensor and the at least one haptic component can be configured to provide a user with a tactile representation of data received from the sensor. In some embodiments, one or more of these components can be built into an existing eyewear unit. In some embodiments, one or more of these components can be added to an existing eyewear unit via a modular unit and/or a remote unit.

In some embodiments, the system can include one or more movable antennas. The movable antennas can transition from a first, stowed configuration to a second, deployed configuration. In some embodiments, an eyewear unit of the system can include one or more movable antennas. In some embodiments, a modular unit of the system can include one or more movable antennas. The movable antenna can be rotatable and/or translatable. In some embodiments, at least one of the movable antennas is rotatable. In some embodiments, the movable antenna can be rotatable along a generally vertical or a generally horizontal axis of rotation. In some embodiments, the movable antenna can be translatable. In some embodiments, in the deployed configuration, the movable antenna can be positioned such that a distance between a user and the antenna is between one-third to two-thirds a length of the antenna.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples of embodiments in accordance with the disclosure, and are not to be considered limiting of its scope, the disclosure will be described with additional specificity and detail through the use of the accompanying drawings.

DETAILED DESCRIPTION

The present specification and drawings provide aspects and features of electronic devices or systems, such as a wearable device or system in the context of several embodiments of devices and methods. The wearable device or system can be a network or communication device or system. These embodiments are described and illustrated in connection with specific types of eyewear such as eyewear having a unitary lens. However, it is to be understood that the features and concepts discussed herein, such as integrated components, modular components, communication features, and communication functionality, can be applied to other types of headworn wearable devices and systems including, but not limited to, eyewear and helmets. Such eyewear can include eyeglasses and goggles having dual lens, a single lens, or no lens. Moreover, the electronic devices and systems can be attached to a proximate structure relevant to the intended use environment, such as, but not limited to, a bicycle handlebar or other portion of a bicycle. In addition, particular features of the devices, systems, and methods should not be taken as limiting, and features of any one embodiment discussed herein can be combined with features of other embodiments as desired and when appropriate. Any feature, step, material, or structure described and/or illustrated in any embodiment can be used with or instead of any other feature, step, material, or structure described and/or illustrated in any other embodiment. Anything in this specification can be omitted in some embodiments; no features described or illustrated in this specification are essential or indispensable.

General System

Figure 1:
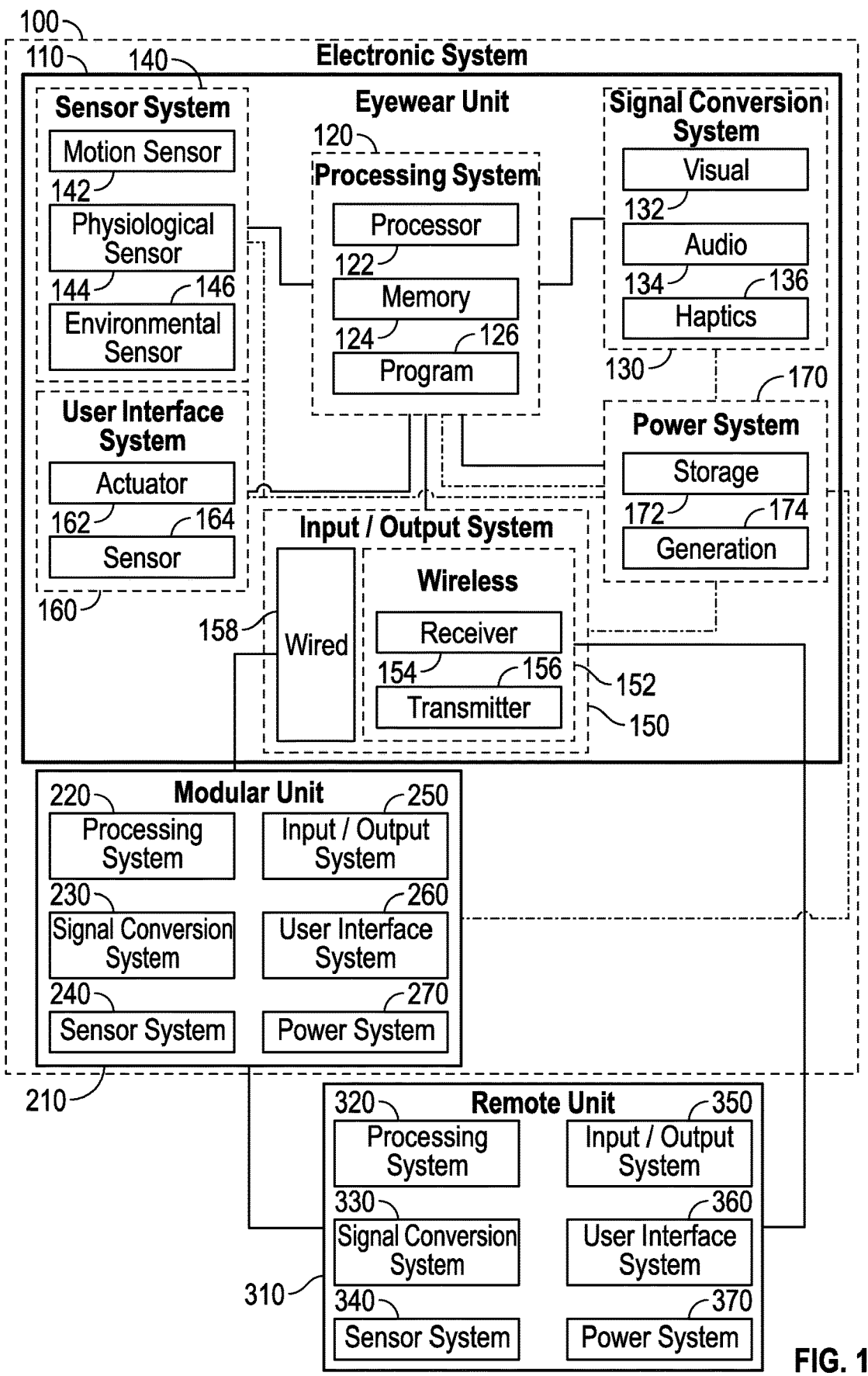
FIG. 1 illustrates a schematic of an embodiment of an electronic device or system in communication with a remote unit, the system having an eyewear unit and a modular unit.

With reference first to the embodiment of the electronic device or system 100, such as a wearable device or system. The wearable device or system can be a network or communication device or system. As illustrated in FIG. 1, the system 100 can be designed to obtain, process, and/or convey data to and/or from a user of the system 100. As shown in the illustrated embodiment, the system 100 can include a headworn wearable unit, such as an eyewear unit 110, with one or more systems such as a processing system 120, a signal conversion system 130, a sensor system 140 (ambient or environmental, motion, biometric, and/or physiological), an input/output (I/O) system 150, a user interface system 160, and a power system 170. The system 100 can also include one or more modular units 210 which can be removably coupled to the eyewear unit 110. In some embodiments, one or more of the modular units 210 can function as source devices and provide signal sources for the system 100. In some embodiments, the one or more modular units 210 can be removably coupled to and/or carried by the eyewear unit 110. This can advantageously provide a more compact and combined form factor for the user and reduce the number of detached components. This can be beneficial when the user does not have sufficient storage or carrying space, such as pockets, to hold detached components.

As shown in the illustrated embodiment, each of the modular units 210 can include one or more systems. For example, the modular units 210 can include one or more systems such as a processing system 220, a signal conversion system 230, a sensor system 240, an input/output (I/O) system 250, a user interface system 260 and a power system 270. As discussed in further detail below, processing system 220, signal conversion system 230, sensor system 240, input/output (I/O) system 250, user interface system 260 and/or power system 270 can include the same or similar components to those discussed in connection with processing system 120, signal conversion system 130, sensor system 140, input/output (I/O) system 150, user interface system 160, and/or power system 170.

Each system can be in communication, wired and/or wirelessly, with one or more other systems. In some embodiments, some or all communications between systems can be two-way communication such that a first system may transmit data to and receive data from a second system. For example, two-way communications may be established between the processing system 120 and the signal conversion system 130. The processing system 120 may transmit data to a speaker of the signal conversion system 130 and receive data from a microphone of the signal conversion system 130. In some embodiments, some or all communications between systems can be one-way communications such that a first system may transfer data to a second system whereas the second system does not transfer data to the first system. For example, the user interface system 160 may transmit data to the processing system 120 and the processing system 120 may not transmit data to the user interface system 160. It should be understood that one or two-way communication can be maintained between any systems described herein. Moreover, it should be understood that, when taken in its entirety, multiple systems can be in communication to each other via other system. For example, the sensor system 140 can be in communication with the signal conversion system 130 via intermediary communications with the processing system 120.

As another example, wired and/or wireless two-way communications may be established between the eyewear unit 110 and one or more modular units 210, such as via input/output systems 150, 250. The eyewear unit 110 may transmit data to one or more modular units 210 and receive data from one or more modular units 210. In some embodiments, some or all communications between the eyewear unit 110 and one or more modular units 210 can be one-way communications such that the eyewear unit 110 may transfer data to one or more modular units 210 whereas one or more modular units 210 does not transfer data to the eyewear unit 110 or vice-versa. It should be understood that one or two-way communication can be maintained between one or more modular units 210 and the eyewear unit 110. For example, two-way communications may exist between eyewear unit 110 and a first modular unit 210 whereas one-way communications may exist between eyewear unit 110 and a second modular unit 210. Moreover, it should be understood that, when taken in its entirety, multiple systems can be in communication to each other via other system. For example, a first modular unit 210 can communicate with a second modular unit 210 either directly via an input/output system 250 and/or through the eyewear unit 110 as an intermediary via input/output system 150.

The systems can be in communication via a wired connection and/or via a wireless connection as illustrated by the solid connecting lines. One or more systems, such as those for the eyewear unit 110 and the modular unit 210, can receive power from the power system 170 as shown by the dash-dot-dash lines. Of course, one or more systems, such as those for the eyewear unit 110 and the modular unit 210, can receive power from the power system 270 either in addition to that received from the power system 170, or solely from the power system 270. Although the systems are shown as communicating to each other through the processing system 120, it should be understood that the systems may bypass the processing system 120 and communicate directly with each other.

In some embodiments, one or more systems of the eyewear unit 110 can be integrated into or with a headworn wearable device, such as an eyewear. For example, one or more of the components of the systems of the eyewear unit 110 can be located on and/or within one or more components of the eyewear such as one or more of the earstems, frame, orbitals and/or lenses. In some embodiments, a plurality of components of the one or more systems can be distributed to different components of the eyewear to help distribute volume and/or weight in the eyewear, thereby enhancing performance and user comfort when utilizing the eyewear with the eyewear unit 110.

In some embodiments, the one or more modular units 210 can be positioned such that a majority of the modular unit 210 is positioned outside the eyewear unit 110. In some embodiments, the one or more modular units 210 can be positioned such that a majority of the modular unit 210 is hidden within a component of the eyewear, such as one or more of the earstems, frame, orbitals, and/or lenses.

The modular unit 210 can be a standalone device which can function without being connected to eyewear unit 110 or any other electronic devices. For example, the modular unit 210 can include a processing system 220, a sensor system 240, and a power system 270 and be capable of recording information even while disconnected from another device. When attached to the eyewear unit 110, the modular unit 210 can provide this data to the eyewear unit 110. In some embodiments, the modular unit 210 can be a standalone device which provides timing functionality to an eyewear unit 110. When removed from the eyewear unit 110, the modular unit 210 can beneficially be used as a timing device (e.g., stopwatch, timer) in other settings. For example, such a modular unit 210 can be used at home, attached to another part of one's person such as a user's wrist, and/or attached to another structural component such as a bike handle. Moreover, the modular unit 210 can supplement the capabilities of the eyewear unit 110 such as by supplementing an existing processing system 120, sensor system 140, and/or power system 170 of the eyewear unit 110 or, in embodiments of eyewear unit 110 without one or more of these systems, wholly adding new functionality to the eyewear unit 110.

The modular unit 210 may not be a standalone device. For example, the modular unit 210 may not include a power system 270 to provide power to electronics contained within the modular unit 210. In some embodiments, the modular unit 210 can receive this power via connection to the eyewear unit 110 or another electronic device.

The eyewear unit 110 and/or the modular units 210 can be in communication, wired and/or wirelessly, with a remote unit 310. As shown in the illustrated embodiment, the remote unit 310 can include one or more systems such as a processing system 320, a signal conversion system 330, a sensor system 340, an input/output (I/O) system 350, a user interface system 360, and a power system 370. As discussed in further detail below, processing system 320, signal conversion system 330, sensor system 340, input/output (I/O) system 350, user interface system 360 and/or power system 370 can include the same or similar components to those discussed in connection with processing systems 120, 220, signal conversion systems 130, 230, sensor systems 140, 240, input/output (I/O) systems 150, 250, user interface systems 160, 260, and/or power systems 170, 270.

The remote unit 310 can be a standalone device or can be operational only when in communication with the system 100 such as the eyewear unit 110 and/or the modular unit 210. Examples of remote units 310 can include one or more electronic devices such as, but not limited to, standalone devices such as cell phones, smart phones, watches, smart watches, PDAs, tablets, laptops, desktops, game consoles, MP3 players, iPods, cameras, fitness or gym equipment, sensors, and the like. For example, the one or more electronic devices can include, bike computers and other on-board vehicle sensors or systems, activity trackers such as a Fitbit, and other wearable and smart devices such as an Apple iWatch, an Apple iPhone, Android-based phones, and other such devices.

In some embodiments, the eyewear unit 110 and/or one or more of the modular units 210 can receive data from the remote units 310 and present or communicate this data to the user of the system 100. For example, the eyewear unit 110 and/or one or more of the modular units 210 can be used to stream music from a remote unit 310, such as a smart phone or MP3 player, and present that to the user. In some embodiments, the eyewear unit 110 and/or one of the modular units 210 can communicate with a remote unit 310, such as a smart phone or cell phone, such that the user of the communication unit 100 can use the eyewear unit 110 and/or one of the modular units 210 for a phone call and/or for sending text messages. In some embodiments, the eyewear unit 110 and/or one or more of the modular units 210 can communicate with multiple remote units 310

Use of a modular unit 210 with the eyewear unit 110 can advantageously supplement the features and functionality of the eyewear unit 110. This can be particularly beneficial as it can allow a user to upgrade the device over time. In this manner, the usable lifespan of the eyewear unit 110 can be expanded thereby reducing waste and reducing total costs to the user who need not replace the eyewear unit 110 with a newer version of the eyewear unit 110 if newer functionality is desired. Moreover, in circumstances where the desired functionality may change depending on the activity being performed by the user, this system can beneficially allow the user to more effectively configure the system 100 depending on the activity.

In some embodiments, the eyewear unit 110 can omit systems such as a processing system 120 and/or signal conversion system 130, which might include components which are expensive to manufacture and are quickly antiquated or rendered incompatible with other components by new developments in technology. The user can then purchase one or more modular units 210 to provide one or more of the upgraded, repaired, or missing systems, or to provide improvements or enhancements to the system. For example, in some embodiments, the eyewear unit 110 can omit the wireless system 152 and the user can connect one or more modular units 210 to provide an input/output system 250 which includes wireless systems. This can be particularly advantageous as wireless protocols often vary for remote units 310 from different manufacturers and, in some instances, from the same manufacturer. The one or more modular units 210 can provide one or more wireless protocols. In some embodiments, the eyewear unit 110 can omit the processing system 120, signal conversion system 130, the sensor system 140, and/or the wireless system 152 and the user can connect one or more modular units 210 to provide the missing systems.

Moreover, it is contemplated that due to advances in technology, systems on the eyewear unit 110 itself can eventually become antiquated by newer technology. The modular unit 210 can be used to supplement or replace existing systems on the eyewear unit 110. For example, the modular unit 210 can be used to assist in providing faster, more efficient, and/or otherwise enhanced operation of the device by including one or more supplemental components, such as a power system 270 and/or supplement storage of data by including a memory with processing system 220. This ability to supplement or improve the existing systems of the device can also be beneficial as the user need not be inconvenienced with purchasing an entirely new eyewear unit 110 to upgrade certain features and functionality. Rather, the user can purchase modular units 210 to add or upgrade components, features and/or functionality of the system 100.

As should be understood from the discussion of the multiple systems below, it should be appreciated that any of the components can be omitted from one or more of the systems of the eyewear unit 110 and/or modular unit 210. Accordingly, it should be understood that any combination of such components between the eyewear unit 110 and/or modular unit 210 can be achieved as desired by the user.

For example, in some embodiments, the modular unit 210 can include systems and/or components which are not present on the eyewear unit 110 or vice versa. For example, in some embodiments, the eyewear unit 110 can include solely a power system 170 and the modular unit 210 can include one or more of a processing system 220, a signal conversion system 230, a sensor system 240, an input/output (I/O) system 250, and a user interface system 260. The eyewear unit 110 can provide power to the modular unit 210 via a port or connector of the eyewear unit 110 similar to those described in connection with I/O system 150 below. In this manner, a user can specifically choose modular units 210 which provide the functionality that the user desires. This can beneficially reduce total costs to the user as the user need not purchase modular units 210 with functionality that the user does not desire. Moreover, selection of specific functionality can further reduce size and/or weight of the system 100.

As another example, in some embodiments, the eyewear unit 110 can include an I/O system 150 and the modular unit 210 can include an I/O system 250 and one or both of the eyewear unit 110 and the modular unit 210 can include a power system. This can beneficially provide for a greater degree of connectivity with other devices. For example, the I/O system 250 can be a more up-to-date wireless protocol capable of communicating with newer devices. In some embodiments, the eyewear unit 110 can include a processing system 120 and power system 170 in addition to the I/O system 150. In some embodiments, the modular unit 210 can include one or more other systems, such as a processing system 220, a signal conversion system 230, a sensor system 240, a user interface system 260, and/or a power system 270 in addition to the I/O system 150. In some embodiments, the modular unit 210 can provide one or more of the following functionality: additional processing capabilities such as a second microprocessor, image capture (e.g., still camera and/or video camera), audio input devices (e.g., microphones, such as a bone conduction microphone), audio output devices (e.g., in-ear speakers, bone conduction speakers, directional audio speakers, outwardly facing speakers), physiological sensing (e.g., heart rate sensors, blood-oxygen sensors, and the like), environmental sensing (e.g., air temperature sensors, air humidity sensors, air quality sensors, pressure sensors, wind speed sensors which can be used in calculating power, and the like), motions sensors (e.g., accelerometers, gyroscope, and the like), biometric calculations (e.g., skin temperature and air temperature to calculate hydration, biochemical sensors to determine sweat characteristics, EEG sensors), provision of directions (e.g., audio and/or visual indicators such as a turn signal and/or haptic feedback, GPS), additional wireless capabilities (e.g., receivers, transmitters, and/or transceivers) which can add new protocols or supplement existing protocols (e.g., a second Bluetooth connection), Wi-Fi, or any other protocol described herein, wind noise reduction (e.g., windscreens, specific housing shapes), enhanced audio (e.g., enhanced speakers), enhanced booms (e.g., built-in power sources such as batteries, different sizes such as smaller sizes designed to better fit women), user interfaces (e.g., touch controls or buttons), power charging (e.g., one or more ports or connectors which allow for charging of the system while still allowing a user to listen to the boom), safety features (e.g., LED lights, radar system which can be rear-facing, peer-to-peer communications), and other functionality.

Use of a remote unit 310 with the system 100 can also advantageously enhance the features and functionality of the system 100. For example, the remote unit 310 can include systems and/or components which are not present on the system 100 or vice versa. Similar to the description in connection with modular unit 210, the user can purchase one or more remote units 310 to provide additional components, features and/or functionality. As should be understood from the discussion of the multiple systems below, it should be appreciated that any of the components can be omitted from one or more of the systems of the system 100 and/or remote unit 310. Accordingly, it should be understood that any combination of such components between the system 100 and/or remote unit 310 can be achieved as desired by the user.

Although the discussion below of the multiple systems is primarily in reference to the eyewear unit 110, it should be understood that such discussion also pertains to systems of the modular unit 210 and the remote unit 310. For example, it should be understood that any or all of the components discussed in connection with processing system 120, signal conversion system 130, sensor system 140, I/O system 150, user interface system 160, and/or power system 170 can also be included instead of or in addition to those described and/or illustrated in processing systems 220, 320, signal conversion systems 230, 330, sensor systems 240, 340, I/O systems 250, 350, user interface systems 260, 360, and/or power systems 270, 370.

Processing System

As shown in the illustrated embodiment of FIG. 1, the support structure such as eyewear unit 110 of the system 100 can include a processing system 120 which can be designed to process and/or store data received from one or more of the other systems of the system, such as the eyewear unit 110, modular unit 210, and/or remote unit 310. As shown in the illustrated embodiment, the processing system 120 can include one or more components, such as a processor 122, a memory 124 and program 126. The processor 122 can be a microprocessor or central processing unit (CPU) designed to receive data from one or more of the other systems and transmit this processed data to one or more of the other systems. In some embodiments, the processor 122 can be designed to process this data in accordance with an algorithm from program 126. The functionality of processor 122 and/or any other component of the eyewear unit 110, modular unit 210, and/or remote unit 310 can be modified and/or enhanced by utilizing a different program 126. The processed data can also be stored in the memory 124 for later use. For example, the data stored in memory 124 can be retrieved at a later time for further processing by the processing system 120 and/or viewing by the user. In some embodiments, the program 126 can be software stored in memory 124 and/or firmware stored in hardware, such as the processor 122 and/or other components of the eyewear unit 110. The program 126 can be updated, modified, fixed, and/or replaced, such as by receiving a new or modified program 126 through the system 100, and/or by attaching the component in which the program 126 is stored or some other portion of the system to another computing device, either in a wired or wireless manner, to convey new or modified program information into the program 126, or by replacing the component in which the program 126 is stored with another component containing a different program 126.

Program 126 can include software which can provide one or more different features or user experiences when utilizing the system 100. For example, such software can include one or more applications which provide one or more features and/or functionality such as, but not limited to, tracking designed to track and store a user's activity such as number of steps taken, amount of time the user was active, environmental conditions in which the system 100 has been used, and the like. The software can also include one or more features and functionality related to user operation of the eyewear unit 110, modular unit 210, and/or remote unit 310, such as voice command functionality allowing for hands-free operation of the units 110, 210, 310. In some embodiments, the software can enable one or more other types of features and functionality such as conversion of text messages to voice messages and vice versa.

In some embodiments, the program 126 can include software found on mobile devices such as, but not limited to, cell phones, smart phones, PDAs, and tablets running Android, iOS, and/or Windows operating systems, etc. For example, the eyewear unit 110 can include an Android, iOS, and/or Windows operating system to enable compatibility with such software. In some embodiments, program 126 can include software found on other types of electronic devices including, but not limited to, laptops and desktops. Advantageously, in embodiments where such functionality is enabled in the eyewear unit 110, the eyewear unit 110 of the system 100 can include one or more functions of other stand-alone mobile devices.

Although program 126 is illustrated as forming part of the processing system 120, as noted above program 126 can include firmware which is built into any aspect of the system, such as in the processor 122 and/or any other components of the eyewear unit 110. For example, program 126 can be used to control the operation of components of the eyewear unit 110 such as the various components of the signal conversion system 130, sensor system 140, I/O system 150, user interface system 160 and/or the power system 170 or similar systems on the modular unit 210 and/or remote unit 310. For example, the program 126 can be used to control the operation of the wireless system 152 of the I/O system 150 which can include a receiver, transmitter, and/or transceiver designed to communicate with other devices typically within a personal area network distance from the eyewear unit 110 using a wireless protocol such as, but not limited to, Bluetooth, Bluetooth Low Energy (Bluetooth Smart), ANT, ANT+, ZigBee, Wi-Fi, GSM, CDMA, and MMS. The program 126 can also be used to monitor the statuses of the one or more sensors of the system 100.

In some embodiments, the modular unit 210 and/or remote unit 310 can include processing systems 220, 320 having components, features and/or functionality similar to that described above in connection with processing system 120. In some embodiments, the eyewear unit 110 can omit one or more components of the processing system 120 such that a user can provide such components with processing systems 220, 320. For example, the eyewear unit 110 can omit the processor 122, memory 124 and/or program 126 allowing the user to supply one or more of such components by connecting the eyewear unit 110 with a modular unit 210 and/or remote unit 310 via a wired connection and/or wirelessly. The eyewear unit 110 can include components which overlap with those of processing systems 220, 320 of the modular unit 210 and/or remote unit 310. This can advantageously supplement and/or enhance the functionality of the processing system 120. For example, the eyewear unit 110 can be provided with a power-efficient processor 122 to conserve battery life and a modular unit 210 and/or a remote unit 310 can include a more powerful processor. As another example, the modular unit 210 and/or remote unit 310 can have a processing system 220, 320 designed to decode MP3s or other audio files and can provide such additional features and/or functionality to the eyewear unit 110 when connected. Of course, in some embodiments, one or more components of the processing systems 220, 320 of the modular unit 210 and/or remote unit 310 can be omitted.

Signal Conversion System

With continued reference to the system 100 illustrated in FIG. 1, the eyewear unit 110 of the system 100 can include a signal conversion system 130 which can be designed to convert signals from one form to another. The signal conversion system 130 can be designed to convert analog and/or digital electrical signals into signals more readily perceptible by the user of the eyewear unit 110 such as audio, visual, and/or tactile signals, etc. The signal conversion system 130 can be designed to convert audio, visual, and tactile signals into analog and/or digital electrical signals for processing by a processing system such as processing system 120. Accordingly, as shown in the illustrated embodiment, the signal conversion system 130 can include one or more of a visual component 132, an audio component 134 and a tactile component 136.

In some embodiments, the visual component 132 can include a display device which can convert analog and/or digital signals into visual images and display them to the user. This may be accomplished by projecting an image or other data directly on the retina (i.e., retinal projection) and/or by displaying an image on an image plane such as a surface or screen within the wearer's field of view such as, but not limited to, an LCD screen, an OLED screen, a projector onto a surface such as a prism having an opaque surface, any other display screen, or a combination of such devices. The display device may be driven by any of a wide variety of source materials, either carried on board the eyewear unit 110, or in communication with the eyeglasses from another source, such as the modular unit 210 and/or the remote unit 310, either via wired communication such as via a wired connection 158 such as a port and/or connector and/or wirelessly such as via the wireless system 152.

In some embodiments, to provide such functionality, the display device can include a variety of components such as those described in connection with FIG. 2, below. In some embodiments, the visual component 132 can include an image capture device which can convert visual images into analog and/or digital signals. For example, the image capture device can be a camera which can capture pictures and/or video. One or more visual components 132 can be removably coupled to one or more components of the system 100 to enable selective use of one or more of the visual components 132. For example, in some embodiments, a user can attach a visual component 132 when needed to receive or transmit visual data, but then remove such visual component 132 when not needed, to reduce the weight and bulk of the eyewear and/or to change the appearance of the eyewear. The removable attachment between the visual component 132 and any other component of the system 100 can be accomplished using any suitable structures or methods, including but not limited to any of the wired or wireless structures or methods described and/or illustrated in this specification.

The visual component 132 can be used to provide the user with visualizations of data desired by the user. For example, the visual component 132 can be used to provide the user with a visualization of data received from one or more of the systems such as the sensors of the sensor system 140. The visual component 132 can provide the user with a visual indicator of parameters being detected and/or measured by the sensors of the sensor system 140 such as, but not limited to, the user's heart rate, body temperature, velocity, acceleration, pace, distance traveled, power expended, energy expended, ambient temperature, pressure, altitude, body orientation and other such parameters and data. By providing a visual indication of such parameters, the user of the device can track such parameters on an ongoing or continuous or constant basis. Other visual indicators of parameters from other systems can also be shown such as the status of such systems. Other types of data, such as pictures and/or videos, can be displayed using the visual component 132. Moreover, the visual component 132 can be used as a camera to capture pictures and/or videos which can be advantageous to increase the safety of the user of the device. For example, the camera can be directed behind and/or laterally to provide the user with images of user's blind spots.

In some embodiments, the audio component 134 can include a speaker device which can convert analog and/or digital signals into sound waves and direct them to the user. This may be accomplished by generating pressure waves and directing these pressure waves to the user's ears, such as via a speaker, and/or by generating vibrations, such as via a bone-conduction speaker. In some embodiments, the audio component 134 can include an audio capture device which can convert sound waves into analog and/or digital signals. For example, the audio capture device can be a microphone.

The audio component 134 can be used to provide the user with audible representations of data desired by the user. For example, the audio component 134 can be used to provide the user with an audible representation of data received from one or more of the systems such as the sensors of the sensor system 140. The audio component 134 can provide the user with intermittent and/or continuous audio updates of parameters being detected and/or measured by the sensors of the sensor system 140 such as, but not limited to, the user's heart rate, body temperature, velocity, pace, distance traveled, power expended, energy expended, ambient temperature, pressure, altitude and other such parameters and data. Other audio updates of parameters from other systems can be shown such as the status of such systems. Other types of data, such as music, voice calls, can also be audibly presented using the audio component 134. The audio component 134 can be used as a microphone which can be used in conjunction with operating the eyewear unit 110, modular unit 210, and/or remote unit 310, voice calls, and similar functions. In some embodiments, the microphone can be used in conjunction with a speaker for purposes of noise cancellation.

In some embodiments, the haptic component 136 can include a force or vibration device which can convert analog and/or digital signals into tactile feedback and direct them to the user. This may be accomplished by generating forces or vibrations, such as via one or more of an imbalanced motor, linear actuators, voice coils, piezoelectrics, electrostatics, and/or electroactive polymers, etc. In some embodiments, the haptic component 136 can include a tactile capture device which can convert tactile forces into analog and/or digital signals. For example, the tactile capture device can comprise one or more piezoelectrics, electrostatics, electroactive polymers, any other device as desired, or a combination of any of these devices.

The haptic component 136 can be used to provide the user with tactile representations of data desired by the user. For example, the haptic component 136 can be used to provide the user with a tactile representation of data received from one or more of the systems such as the sensors of the sensor system 140. Accordingly, the haptic component 136 can provide the user with intermittent and/or continuous tactile updates of parameters being detected and/or measured by the sensors of the sensor system 140 such as, but not limited to, the user's heart rate, body temperature, velocity, pace, distance traveled, power expended, energy expended, ambient temperature, pressure, altitude and other such parameters and data. In some embodiments, the haptic component 136 can vibrate to provide the user with notifications of trigger events. For example, the haptic component 136 can vibrate when an email or text message has been received, when a call is being received, and other types of trigger events.

In some embodiments, one or more haptic components 136 can be positioned on multiple components of the eyewear unit 110 and/or modular unit 210. For example, haptic components 136 can be placed on lateral components of the eyewear unit 110, such as earstems of an eyewear, and on anterior components of the eyewear unit 110, such as the frame of the eyewear or the nosepiece of the eyewear. The different haptic components 136 can be activated separately or together based on the specific trigger event. For example, if an email or text message is received, a lateral haptic component 136 can be activated. If a call is being received, an anterior haptic component 136 can be activated. Separate activation of different haptic components 136 can help the user to more easily identify different trigger events.

In some embodiments, use of multiple haptic components 136 can be used to assist the user in navigation. For example, a haptic component 136 located to the left of the user's head can be activated to indicate to the user to turn left, a haptic component 136 located to the right of the user's head can be activated to indicate to the user to turn right, and a haptic component 136 located to the front of the user's head can be activated to indicate to the user to continue proceeding forward. Use of haptic components 136 for navigation can be particularly beneficial for users of the eyewear unit 110 and/or modular unit 210 who are blind and/or deaf. This can also be particularly beneficial, even for those with full vision and/or hearing capabilities, when use of visual indicators and/or audio indicators may be intrusive or impractical during a particular activity, such as when other visual or audio indicators are already being utilized by a user. In some embodiments, the haptic components 136 can be used to inform a user of objects and/or persons in a user's blind spot. This can beneficially enhance the safety of the user of the device. As another example, visual indicators could potentially make the user more visible to others as a result of the light output in providing such indicators. Audio indicators can potentially be heard by others.

In some embodiments, the modular unit 210 and/or remote unit 310 can include signal conversion systems 230, 330 having components, features and/or functionality similar to or the same as any of those described above in connection with signal conversion system 130. In some embodiments, the eyewear unit 110 can omit one or more components of the signal conversion system 130 such that a user can provide such components with signal conversion systems 230, 330. For example, the eyewear unit 110 can omit the visual component 132, audio component 134 and/or haptic component 136 thereby allowing the user to supply one or more of such components by connecting the eyewear unit 110 with a modular unit 210 and/or remote unit 310 via a wired connection and/or wirelessly. In some embodiments, an audio component such as an in-ear, on-ear, near-ear, over-the-ear, and/or an outwardly facing speaker can be provided on a modular unit 210 and/or remote unit 310. For example, the remote unit 310 can have an outwardly facing speaker and serve as an external speaker. The eyewear unit 110 can include components which overlap with those of the signal conversion systems 230, 330 of the modular unit 210 and/or remote unit 310. This can advantageously supplement and/or enhance the functionality of the signal conversion system 130. For example, the eyewear unit 110 can be provided with a speaker and a modular unit 210 and/or remote unit 310 can be provided with a microphone. In some embodiments, one or more components of the signal conversion systems 230, 330 of the modular unit 210 and/or remote unit 310 can be omitted.

Sensor System

With continued reference to the system 100 illustrated in FIG. 1, the eyewear unit 110 of the system 100 can include a sensor system 140 which can be designed to obtain sensory data from the environment (e.g., an ambient or environmental sensor) and/or the user (a biometric and/or physiological sensor). Accordingly, as shown in the illustrated embodiment, the sensor system 140 can include a plurality of sensors including, but not limited to, one or more motion sensors 142, one or more biometric and/or physiological sensors 144, and one or more ambient or environmental sensors 146. By utilizing data from the sensor system 140, the eyewear unit 110 can provide beneficial data regarding the user's condition and/or the surrounding environment. The data received from the sensor system 140, can be further processed by the processing system 120 to provide the user with general data about the user's activities, such as number of steps taken and duration of time the user was active.

The one or more motion sensors 142 can be designed to detect and/or measure movement or motion. The one or more motion sensors 142 can include any type of sensor which can detect and/or measure such movement or motion including, but not limited to, an accelerometer to detect and/or measure acceleration and a gyroscope to detect and/or measure orientation. Other types of sensors motion sensors 142 can also be used such as, but not limited to, a cadence sensor for measuring the rotational speed of a crank arm of a bicycle, a speed sensor for measuring the speed of a bike, a pedometer for measuring the number of steps taken by a user and similar sensors. It should be understood that some of these sensors may be more advantageously placed, for example, on one or more remote units 310 due to the positioning of such sensors relative to the user. For example, a cadence sensor and/or pedometer may be more advantageously placed proximate a user's feet.

The one or more physiological sensors 144 can be designed to detect and/or measure one or more physiologic parameters of the user. As such, the one or more physiological sensors 144 can include any type of sensor which can detect and/or measure such physiological parameters including, but not limited to, sensors for monitoring cardiovascular parameters such as a heart rate sensor, a blood pressure sensor, a blood sugar sensor, and a blood-oxygen and/or blood CO2 sensor, sensors for monitoring hydration levels and temperature of a user such as a perspiration sensor, a skin resistivity sensor, a hydration sensor, a dermal moisture sensor, an electrolyte sensor, and a body temperature sensor, and/or any other types of sensors, such as a lactic acid sensor and pO2 sensor. Other types of physiological sensors 144 can be used as desired. It should be understood that some of these sensors may be more advantageously placed, for example, on one or more remote units 310 due to the positioning of such sensors relative to the user. For example, a heart rate sensor may be more advantageously placed in contact with or adjacent a user's chest.

The one or more ambient or environmental sensors 146 can be designed to detect and/or measure parameters of the surrounding environment. As such, the one or more ambient or environmental sensors 146 can include any type of sensor which can detect and/or measure such parameters including, but not limited to, an air temperature sensor, an air humidity sensor, a pressure sensor, an altitude sensor (such as an altimeter), an oxygen sensor, an air quality sensor, a wind speed sensor (such as a pitot tube), a solar irradiance sensor, a proximity sensor such as a sonar device, a magnetometer, and any other sensor which can detect parameters of the surrounding environment. In some embodiments, the ambient or environmental sensor 146 can include a range finder which can detect a distance to an object.

In some embodiments, the modular unit 210 and/or remote unit 310 can include sensor systems 240, 340 having components, features and/or functionality similar to that described above in connection with sensor system 140. In some embodiments, the eyewear unit 110 can omit one or more components of the sensor system 140 such that a user can provide such components with sensor systems 240, 340. For example, the eyewear unit 110 can omit the motion sensor 142, physiological sensor 144 and/or ambient or environmental sensor 146 thereby allowing the user to supply one or more of such components by connecting the eyewear unit 110 with a modular unit 210 and/or remote unit 310 via a wired connection and/or wirelessly. In some embodiments, a heart rate sensor, gyroscope, accelerometer and/or magnetometer can be provided on a modular unit 210 and/or remote unit 310. Of course, the eyewear unit 110 can include components which overlap with those of the sensor systems 240, 340 of the modular unit 210 and/or remote unit 310. This can advantageously supplement and/or enhance the functionality of the sensor system 140. For example, the eyewear unit 110 can be provided with an accelerometer, gyroscope, and a modular unit 210 can be provided with a heart rate sensor and a remote unit 310 can be provided with a cadence sensor. In some embodiments, one or more components of the sensor systems 240, 340 of the modular unit 210 and/or remote unit 310 can be omitted.

Input/Output (I/O) System

With continued reference to the system 100 illustrated in FIG. 1, the eyewear unit 110 of the system 100 can include an I/O system 150 which can interface with one or more modular units 210 and/or one or more remote units 310. As shown in the illustrated embodiment, the I/O system 150 can include a wireless system 152 as well as one or more wired connections 158, such as ports and/or connectors, for removable mechanical and/or electrical coupling with another device such as one or more modular units 210. As shown in the illustrated embodiment of FIG. 1, the eyewear unit 110, the modular unit 210, and/or the remote unit 310 can each communicate with each other such that the units 110, 210, 310 can receive communications from and/or send communications to each other. For example, as shown in FIG. 1, each of the respective input systems of each of the eyewear unit 110, the modular unit 210, and/or the remote unit 310 can receive communications from each of the respective output systems of each of the eyewear unit 110, the modular unit 210, and/or the remote unit 310; and each of the respective output systems of each of the eyewear unit 110, the modular unit 210, and/or the remote unit 310 can send communications to each of the respective input systems of each of the eyewear unit 110, the modular unit 210, and/or remote unit 310.

The wireless system 152 can include one or more receivers 154 to receive wireless signals from another device such as one or more remote units 310 and one or more transmitters 156 to send wireless signals to another device such as one or more remote units 310. The wireless system 152 can include one or more transceivers which can perform both functions. The one or more receivers 154, one or more transmitters 156, and/or one or more transceivers can include one or more antennas. The one or more antennas can be configured to receive one or more electronic signals including, but not limited to, Bluetooth, Bluetooth Low Energy (Bluetooth Smart), ANT, ANT+, ZigBee, Wi-Fi, GSM, CDMA, MMS, and/or any other type of signal. The one or more antennas can be positioned on any portion of the eyewear unit 110 including, but not limited to, portions of a face or frame such as a nosepiece region or nosepad, lateral regions of the face or frame, a brow, and/or orbital regions, portions of an earstem such as an anterior region of the earstem, a posterior region of the earstem, a bottom surface of the earstem, a top surface of the earstem, an outer surface of the earstem, and/or an inner surface of the earstem, and/or portions of a lens such as a periphery of the lens, an anterior surface of the lens, and/or a posterior surface of the lens. In some embodiments, the antennas can be positioned along bottom, top, outer, and/or inner surfaces of any portion of the eyewear unit 110. In some embodiments, the antennas can be positioned along interior and/or exterior surfaces of the eyewear unit 110. The one or more antennas can include movable antennas, such as antenna 1600, discussed in further detail below in connection with FIGS. 14 and 15. For example, in some embodiments the movable antenna can be an articulating antenna which is coupled to the eyewear unit at a movable joint.

The one or more receivers 154 and/or one or more transmitters 156 can be designed to wirelessly communicate with other devices using one or more protocols. For example, the receiver 154 and/or transmitter 156 can include protocols such as Bluetooth, Bluetooth Low Energy (Bluetooth Smart), ANT, ANT+, ZigBee, Wi-Fi, GSM, CDMA, and MMS. The receiver 154 can be designed such that the eyewear unit 110 is viewed as an ANT+ master unit when communicating with other ANT+ devices. In some embodiments, the one or more receivers 154 and/or one or more transmitters 156 (or transceivers) can include two or more protocols such that the eyewear unit 110 can advantageously be used with a wider variety of devices such as modular units 210 and/or remote units 310. In some embodiments, the one or more receivers and/or one or more transmitters (or transceivers) can utilize the two or more protocols simultaneously. In some embodiments, the receiver 154 can be designed to receive signals from a global positioning satellite (GPS). As shown in the illustrated embodiment, the wireless system 310 can be designed to wirelessly communicate with the one or more remote units 310.

The one or more wired connections 158, such as ports and/or connectors, can allow for removable mechanical and/or electrical coupling with other devices such as one or more modular units 210. The one or more wired connections 158 can be designed to be universally compatible with a variety of devices. For example, in some embodiments, the one or more wired connections 158 can include a Universal Serial Bus (USB) port and/or connector, such as USB 1.0, USB 2.0, USB 3.0, USB 3.1, and including microUSB and type-C ports and/or connectors, an IEEE 1394 (FireWire) port and/or connector, an Ethernet port and/or connector, a Thunderbolt port and/or connector, a Displayport port and/or connector, a DVI port and/or connector, an HDMI port and/or connector, an optical port and/or connector, a coaxial port and/or connector, and/or other ports and/or connectors. In some embodiments, the one or more wired connections 158 can have different mechanical and/or electrical connectors to allow for an even wider range of devices to be used. For example, a first wired connection 158 can be a USB 3.0 port or connector whereas a second wired connection 158 can be a Thunderbolt port or connector. As shown in the illustrated embodiment, the one or more wired connections 158 can be designed to mechanically and/or electrically couple with the one or more modular units 210. The wired connections 158 can be positioned on any portion of the eyewear unit 110 including, but not limited to, portions of a face or frame such as a nosepiece region or nosepad, lateral regions of the face or frame, a brow, and/or orbital regions, portions of an earstem such as an anterior region of the earstem, a posterior region of the earstem, a bottom surface of the earstem, a top surface of the earstem, an outer surface of the earstem, and/or an inner surface of the earstem, and/or portions of a lens such as a periphery of the lens, an anterior surface of the lens, and/or a posterior surface of the lens. In some embodiments, the wired connections 158 can be positioned along bottom, top, outer, and/or inner surfaces of any portion of the eyewear unit 110. In some embodiments, the wired connections 158 can be positioned along interior and/or exterior surfaces of the eyewear unit 110.

The one or more modular units 210 can have different shapes, appearances, features, and/or functionality, but the modular units 210 can include generally the same mechanical and/or electric connectors to wired connections 158 to enable interchangeability. In some embodiments, a vendor can provide a selection (simultaneously or over time) of a plurality of different interchangeable modular units 210 with multiple different shapes, sizes, and/or colors, and/or with different features and/or functionality. In this way, a user can purchase different modular units 210 to customize the user's system 100, to upgrade the user's system 100, and/or to replace broken or damaged components in the user's system 100. In some embodiments where the modular unit 210 includes a universally compatible wired connection, such as a USB connector, the modular unit 210 can be connected to other devices which have a similar connector. For example, the modular unit 210 could be attached to devices such as, but not limited to, a computer, a smartphone, an audio/video player, and a vehicle entertainment system. In some embodiments, each or all of the modular units 210 can be standalone devices which can be removed from the eyewear unit 110 and function separately from the eyewear unit 110 or any other electronic devices.

In some embodiments, the modular units 210 are mounted in close proximity to the eyewear unit 110. The eyewear unit 110 and modular unit 210 can be coupled to form a relatively compact, combined unit. This can be particularly advantageous in many situations as this can reduce the burden on the user of the system 100. By placing both the eyewear unit 110 and the modular unit 210 in an eyewear, the user need not be inconvenienced with using such remote devices.

In some embodiments, the modular unit 210 and/or remote unit 310 can include I/O systems 250, 350 having components, features and/or functionality similar to that described above in connection with I/O system 150. For example, in some embodiments, the modular unit 210 can include a wireless system having a receiver, transmitter and/or transceiver similar to that discussed in connection with I/O system 150. In some embodiments, the eyewear unit 110 can omit one or more components of the I/O system 150 such that a user can provide such components with I/O systems 250, 350. For example, the eyewear unit 110 can omit the wireless system 152 including the receiver 154 and/or transmitter 156, and/or wired connection 158 thereby allowing the user to supply one or more of such components by connecting the eyewear unit 110 with a modular unit 210 and/or remote unit 310 having one or more of such components. In some embodiments, a port and/or connector can be provided on a modular unit 210 and/or remote unit 310 to allow additional modular units 210 to be attached to the system 100. The eyewear unit 110 can include components which overlap with those of the I/O systems 250, 350 of the modular unit 210 and/or remote unit 310. This can advantageously supplement and/or enhance the functionality of the I/O system 150. For example, the eyewear unit 110 can be provided with a wireless system 152 having Bluetooth and/or ANT+ protocols and the modular unit 210 can be provided with a wireless system having different protocols such as ZigBee or Wi-Fi. In some embodiments, the eyewear unit 110 can be provided with no wireless system 152 and the modular unit 210 can be provided with a wireless system having one or more different protocols. This can be particularly beneficial when wireless protocols are often updated thereby reducing the likelihood that the eyewear unit 110 will have an antiquated wireless protocol. In some embodiments, one or more components of the I/O systems 250, 350 of the modular unit 210 and/or remote unit 310 can be omitted.

While the input/output system 110 have been generally described as having a wireless system 152 for communication with remote units 310 and one or more wired connections 158 for communication with modular units 210, in some embodiments communications between the eyewear unit 110 and one or more modular units 210 can be via the wireless system 152 and/or wired connections 158 and/or communications between the eyewear unit 110 and the remote units 310 can be can be via the wireless system 152 and/or wired connections 158. In some embodiments, communications between the modular unit 210 and the remote unit 310 can be via wireless systems of input/output systems 250, 350. In some embodiments, communications between the modular unit 210 and the remote unit 310 can be via one or more wireless systems and/or wired connections of the input/output systems 250, 350.

User Interface System

With continued reference to the system 100 illustrated in FIG. 1, the eyewear unit 110 of the system 100 can include a user interface system 160 which can be designed to allow the user to operate the eyewear unit 110, modular unit 210, and/or remote unit 310. As shown in the illustrated embodiment, the user interface system 160 can include one or more actuators 162 and/or one or more sensors 164.

In some embodiments, the one or more actuators 162 can include mechanical switches such as, but not limited to, toggle, rocker, button, and/or rotary switches. One or more actuators 162 can advantageously be used to provide tactile feedback when operating the switch such that the user can easily operate the device without having to view the actuators 162 directly. The actuators 162 can be used to control one or more operating parameters such as the on-off state of the eyewear unit 110, modular unit 210, and/or remote unit 310, audio volume control, and/or video brightness control, etc.

In some embodiments, the one or more sensors 164 can include sensors which detect contact such as capacitive and/or resistive sensors. In some embodiments, the capacitive and/or resistive sensors can be designed to detect contact with a user's finger. For example, the user interface system 160 can include a touch screen having capacitive and/or resistive sensors on which the user can use different gestures to modify parameters of the eyewear unit 110, modular unit 210 and/or remote unit 310. Such gestures can include, but are not limited to, a frontward swipe, a rearward swipe, an upward swipe, a downward swipe, one or more taps such as a double or triple tap, pressing the screen for a specific duration of time, a multiple position tap, and any combination of the above. The touch screen can be sized to fit along any portion of the eyewear unit 110, including but not limited to a face and/or an earstem of the eyewear unit 110.

In some embodiments, the modular unit 210 and/or remote unit 310 can include user interface systems 260, 360 having components, features and/or functionality similar to that described above in connection with user interface system 160. In some embodiments, the eyewear unit 110 can omit one or more components of the user interface system 160 such that a user can provide such components with user interface systems 260, 360. For example, the eyewear unit 110 can omit the actuator 162 and/or sensor 164 thereby allowing the user to supply one or more of such components by connecting the eyewear unit 110, via a wired connector and/or wirelessly, with a modular unit 210 and/or remote unit 310 having one or more of such components. This can be beneficial as it can allow a user to select a type of user interface that the user prefers and/or switch the type of user interface. For example, a user may find it advantageous to use a user interface having tactile buttons for certain activities and may find it more advantageous to utilize a user interface having touch capabilities for other activities. Accordingly, the user may wish to swap between a tactile button user interface with a touch user interface based on the specific activity. Of course, the eyewear unit 110 can include components which overlap with those of the user interface systems 260, 360 of the modular unit 210 and/or remote unit 310. This can advantageously supplement and/or enhance the functionality of the user interface system 160. Of course, in some embodiments, one or more components of the user interface systems 260, 360 of the modular unit 210 and/or remote unit 310 can be omitted.

Power System

With continued reference to the system 100 illustrated in FIG. 1, the eyewear unit 110 of the system 100 can include a power system 170 which can be designed to provide energy to the one or more systems of the eyewear unit 110, modular unit 210 and/or remote unit 310. As shown in the illustrated embodiment, the power system 170 can include an energy storage component 172 and/or an energy generation component 174.

The energy storage component 172 can be a device designed to store energy for use with the eyewear unit 110, modular unit 210 and/or remote unit 310. For example, the energy storage component 172 can be a battery device such as primary cell (non-rechargeable) and/or a secondary cell (rechargeable) such as, but not limited to, a Li-ion battery, LiPo battery, NiCad battery, and Ni-MH battery. The battery device can be designed to provide between about 50 mAh to about 500 mAh, about 150 mAh and/or any other energy storage capacity as desired. In some embodiments, the energy storage component 172 can be a capacitor, fuel cell, or other device which can store energy for later use.

The energy generation component 174 can be a device designed to generate energy from another source. The energy generation component 174 can be a device designed to convert kinetic energy, solar energy and/or thermal energy to electrical energy for powering the systems of eyewear unit 110, modular unit 210 and/or remote unit 310. The energy generation component 174 can be a device designed to convert electromagnetic energy to electrical energy. In such an embodiment, the eyewear unit 110, modular unit 210 and/or remote unit 310 can be wirelessly powered and charged.

In some embodiments, the modular unit 210 and/or remote unit 310 can include power systems 270, 370 having components, features and/or functionality similar to that described above in connection with power system 170. In some embodiments, the eyewear unit 110 can omit one or more components of the power system 170 such that a user can provide such components with power systems 270, 370. For example, the eyewear unit 110 can omit the energy storage component 172 and/or energy generation component 174 thereby allowing the user to supply one or more of such components by connecting the eyewear unit 110 with a modular unit 210 via a wired connection and/or wirelessly. In some embodiments, the modular unit 210 can be provided with an energy storage component such as a battery. The eyewear unit 110 can include components which overlap with those of the power systems 270, 370 of the modular unit 210 and/or remote unit 310. This can advantageously supplement and/or enhance the functionality of the power system 170. For example, the modular unit 210 can include an energy storage component to supplement the energy storage component 172 of the eyewear unit 110 thereby increasing the duration of operation of the eyewear unit 110, modular unit 210 and/or remote unit 310. In some embodiments, one or more components of the power systems 270, 370 of the modular unit 210 and/or remote unit 310 can be omitted.

Examples of Display Devices

Figure 2:
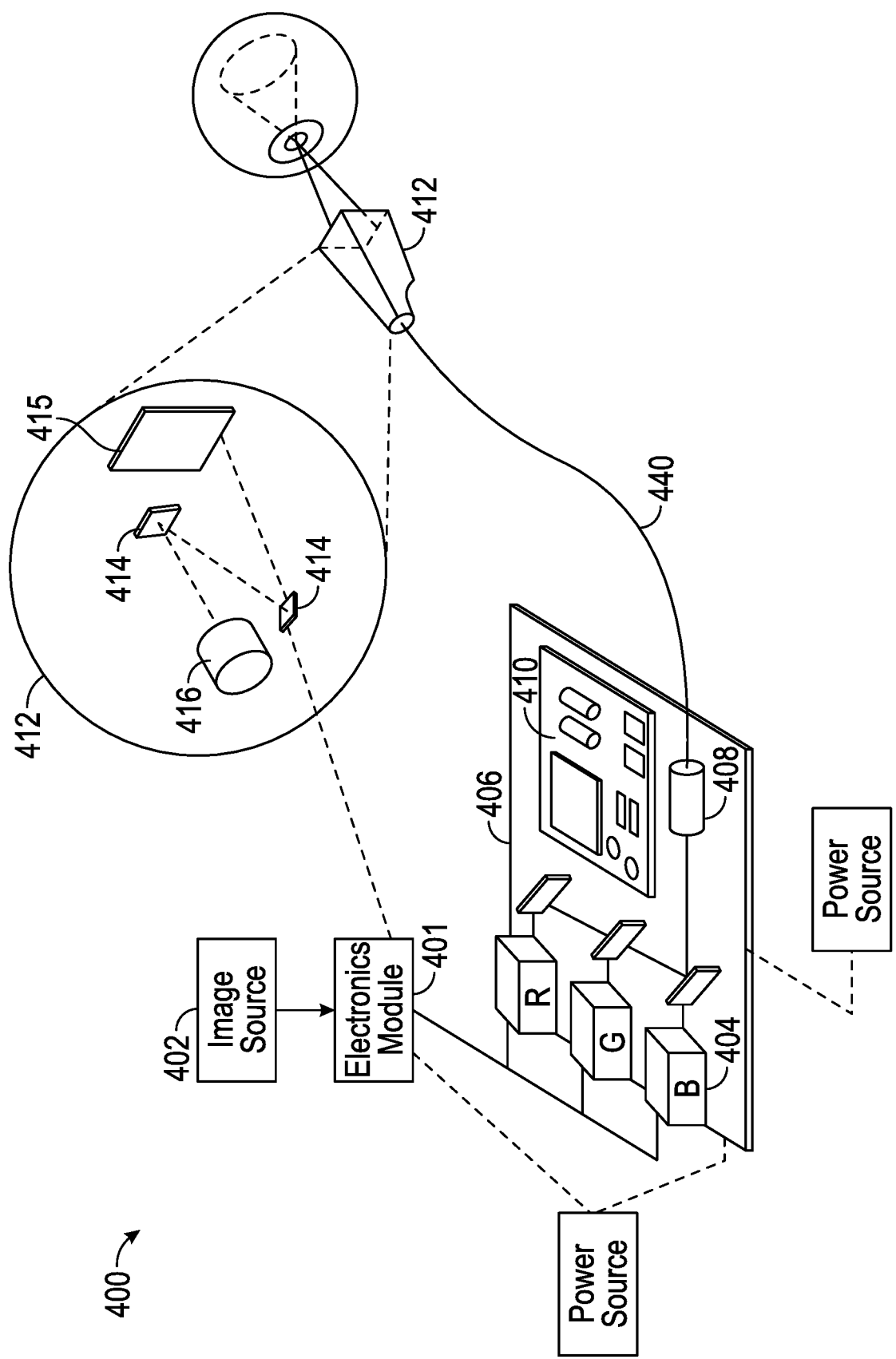
FIG. 2 illustrates an embodiment of electronics used in conjunction with a display device for providing retinal projection of an image onto the retina of a user.

With reference to the embodiment of electronics 400 illustrated on FIG. 2, the display device can be operative to project at least one optical beam onto a retina of the wearer and/or displaying an image on a surface or screen within the wearer's field of view. The display device can be in optical and/or electrical communication with electronics 400 which provide the display device with optical image data that is utilized to produce the optical beam. The display device can include a transmission component 440, as described below.

The electronics 400 can include an electronics module 401 that receives image data from an image source 402. The image data can include data utilizable to create an image, such as placement and intensity of color in the image. The electronics module 401, as is known in the art, can be used to decipher the image data such that it can be optically portrayed by the electronics 400. The electronics 400 can include one or more light sources 404, color combining optics 406, a photonics module 408, and/or modulators 410, etc. Any or all of these components can be in electronic communication with the electronic module 401 and receive the deciphered imaged data therefrom and create the image based on the deciphered image data.

The light sources 404 can convey the image in RGB (red, green, blue) and/or can be modulated and combined utilizing the color combining optics 406, the photonics module 408, and the modulators 410. Finally, a scanner module 412, which can be mounted on the display device, can project the optical beam onto the retina of the wearer in order to raster scan or "paint" or convey the optical image onto the retina. The scanner module 412 can include one or more micro electro-mechanical structures such as scanners 414, a diffuser 415, and/or a focusing lens 416. The image can be painted or conveyed in RGB at the rate of at least approximately 30 times per minute or more for premium resolution. However, other scanning rates can also be used as desired. It should be understood that these components and systems can also be adapted for use in displaying an image on a surface or screen within the wearer's field of view.

As mentioned above, embodiments can be favorably implemented in combination with various electronics 400; it is also contemplated that with the advance of science, new and improved electrical and optical components can become available and be incorporated into embodiments. The optical beam can be directly or indirectly projected toward the eye of the wearer. Therefore, although FIG. 2, as well as other figures, illustrate direct retinal projection, it is contemplated that the optical beam can be reflected off of other structures incorporated into the optical element, such as the lens or lenses of an eyewear or other reflective surface. Moreover, it should also be understood that at least some components described in connection with FIG. 2 can also form part of other systems of the eyewear unit 110 including, but not limited to, the processing system 120 and the power system 170.

In some embodiments, the display device can include visual display and/or optical components. These components can include a display such as a liquid crystal display (LCD), a plasma display, a semiconductor device (LD), a light-emitting diode (LED), an organic light emitting diode (OLED), active OLED, AMOLED, super AMOLED, a projector, direct retinal projection through virtual retinal display (VRD) or retinal scan display (RSD) using a retinal projector (RP), micro-electro-mechanical systems display, an electroluminescence (EL), a cathode ray tube (CRT), a digital micromirror device (DMD), prism(s), lens(es), fiber-optic transmission component(s), mirror(s), a holographic optical element (HOE), laser projection, 3D display components or circuitry, or another emissive, transmissive, or reflective display technology, or the like is preferably used.

The system can produce real or virtual images for user perception. Further, the system can provide augmented visuals of natural objects perceived by the user.

The viewing plane for the system can be on a lens of the eyewear (goggles or eyeglasses) or spaced from the lens (either in front or behind the lens). The viewing plane can be real or virtual. Further, the system and/or eyewear can also comprise variable light attenuation features (e.g. electronic variable light attenuation) in the lens(es) or otherwise to enhance video display perception. The viewing plane can incorporate one or more display and/or light attenuation components.

In some embodiments, the display device can have a viewing surface or plane positioned along a surface of a lens or other surface of the eyewear. The display device can comprise one or more visual display units. The display device, such as an OLED display or otherwise, can provide a real or virtual image for the wearer. The display device can also incorporate light attenuation technology, such as electronic variable light attenuation. In some embodiments, the display device can be fitted onto a front or rear surface of a lens to provide a permanent or removable engagement with the lens.

In some embodiments, the display device can be positioned on an arm, such as a movable or articulating arm, of an eyewear unit or other component of the system.

Embodiments of Network Configurations

Figure 3A:
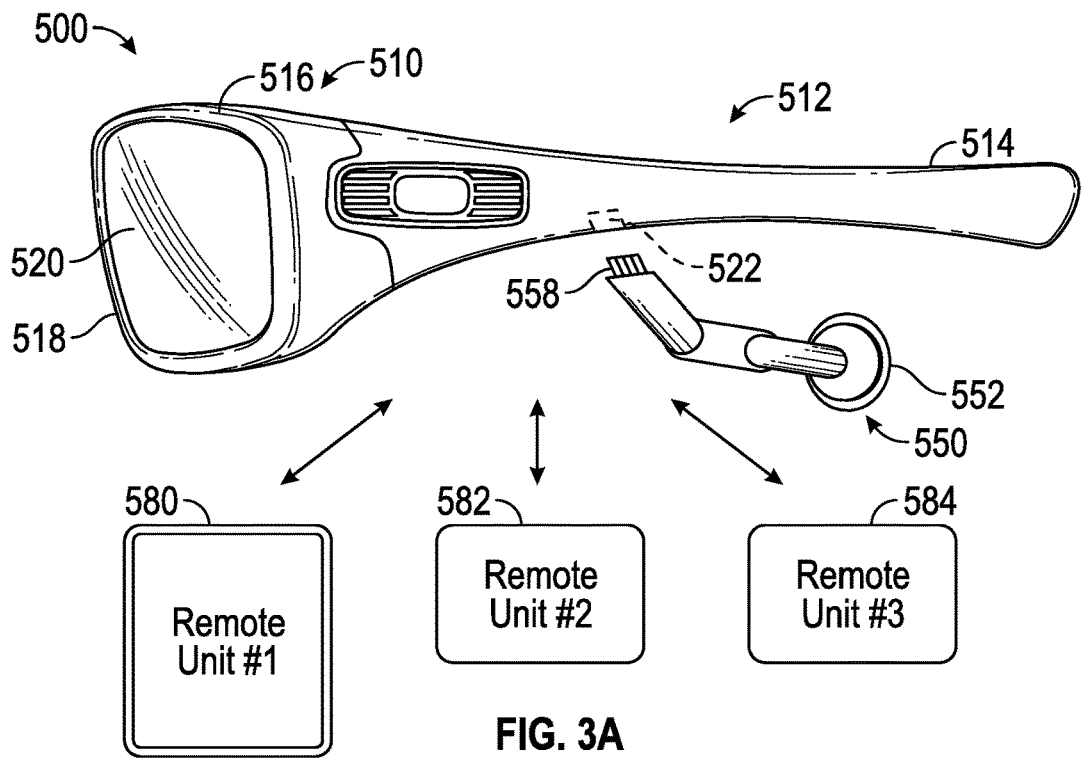
FIG. 3A illustrates a schematic of an embodiment of an electronic device or system in communication with multiple remote units, the system having an eyewear unit and a modular unit.
Figure 3B:
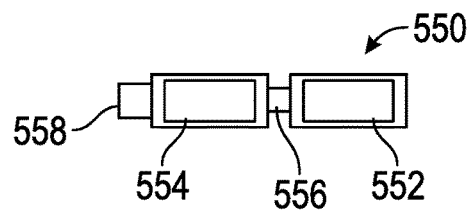
FIG. 3B illustrates a schematic of an embodiment of the modular unit of FIG. 3A.

With reference now to the embodiment of the electronic device or system 500, such as a wearable device or system. The wearable device or system can be a network or communication device or system. As illustrated in FIGS. 3A and 3B, the system 500 can be designed to obtain, process, and/or convey data to a user of the system 500. The system 500 can include both an eyewear unit 510 and a modular unit 550, shown here as an earbud (e.g., a device that can be positioned in and/or retained by an inner portion of an ear), which can be removably coupled to the eyewear unit 510. The eyewear unit 510 and the modular unit 550 can be similar to the eyewear unit 110 and the modular unit 210 described above in connection with FIG. 1. Accordingly, the eyewear unit 510 and the modular unit 550 can include systems such as, but not limited to, a processing system, a signal conversion system, a sensor system, an input/output (I/O) system, a user interface system and a power system.

The eyewear unit 510 can include a microprocessor to process data, memory for data storage, wireless receivers and transmitters (or transceivers) with protocols used in the industry, such as Bluetooth and/or ANT+, or any future protocols to communicate with modular units and/or remote devices 580, 582, 584, and a plurality of sensors such as environmental sensors (e.g., an altimeter, a temperature sensor, a humidity sensor, and the like), physiological sensors (e.g., a heart rate sensor, a blood-oxygen sensor, and the like), motions sensors (e.g., accelerometers, gyroscope, and the like), and/or other sensors. As shown in the illustrated embodiment, the components of one or more systems of the eyewear unit 510 can be integrated into an eyewear 512 thereby providing a relatively compact form factor. Accordingly, components such as a microprocessor, memory, wireless receivers and transmitters (or transceivers), and sensors can be provided within the multiple earstems 514, frame 516, nosepiece 518, and/or lens or lenses 520 of the eyewear 512.

In order to removably couple the modular unit 550 to the eyewear unit 510, the eyewear unit 510 can include a port 522 such as a USB 3.0 Type-C port. This port 522 can also be used for other functionality such as updating software on the eyewear unit 510 and charging the eyewear unit 510. As shown in the illustrated embodiment, the port 552 is positioned along a bottom portion of an earstem 514. The port 552 can be positioned on any portion of the eyewear unit 510 including, but not limited to, portions of a face or frame such as a nosepiece region or nosepad, lateral regions of the face or frame, a brow, and/or orbital regions, portions of an earstem such as an anterior region of the earstem, a posterior region of the earstem, a bottom surface of the earstem, a top surface of the earstem, an outer surface of the earstem, and/or an inner surface of the earstem, and/or portions of a lens such as a periphery of the lens, an anterior surface of the lens, and/or a posterior surface of the lens. In some embodiments, the port 552 can be positioned along bottom and/or top surfaces of the eyewear unit 510. In some embodiments, the port 552 can be positioned along bottom, top, outer, and/or inner surfaces of any portion of eyewear unit 510. While a single port 552 is described herein, two or more ports may be used and positioned on the eyewear unit 510.

A simplified schematic of modular unit 550 is illustrated in FIG. 3B. As shown in the illustrated embodiment, the modular unit 550 can include one or more modules 552, 554. For example, in some embodiments, module 552 can include components of a signal conversion system such as, but not limited to, a microphone, a speaker, a video display, a camera, haptics. As shown, module 552 can include an in-ear or mid-ear speaker. In some embodiments, module 554 can include a microprocessor, multiple sensors such as, but not limited to, an accelerometer, gyroscope, and magnetometer. The housing of the modular unit 550 can include one or more moveable joints 556 which permit translation and/or rotation about the joints 556. Accordingly, this can advantageously allow a user to orient components of the modular unit 550, such as the module 552, into a proper position such that the user can utilize such components in a comfortable manner. In order to removably couple the modular unit 550 to the eyewear unit 510, the modular unit 550 can include a connector 558 such as those described above in connection with input/output system 150, including, but not limited to, a USB 3.0 Type-C connector. The modular unit 550 can receive communications from the eyewear unit 510 via the connection; and the eyewear unit 510 can receive communications from the modular unit 550 via the connection.

In some embodiments, a heart rate sensor can be provided in or proximate the module 552. For example, the heart rate sensor can be a valence cell provided on or proximate the speaker of module 552 illustrated in FIG. 3B. The modular unit 550 can include an additional port or connector. In some embodiments, the user can have an array of different modular units, such as but not limited to multiple single-purpose modular units, each with a different sensor, so that the wearer can select one or more desired modular units to connect to the eyewear unit 510 to customize the nature of the data to the activity being performed by the wearer.

As shown in the illustrated embodiment, the eyewear unit 510 and/or modular unit 550 can wirelessly communicate with one or more remote units such as first, second and third remote units 580, 582, 584. The first remote unit 580 can be an electronic device having advanced processing capabilities such as a smartphone, PDA, tablet, laptop, and the like. In some embodiments, when the eyewear unit 510 and/or the modular unit 550 is in communication with such a device, additional features and/or functionality from such electronic devices can be transferred directly to the eyewear unit 510, to the modular unit 550, and/or to the eyewear unit 510 via the modular unit 550 or vice versa. For example, the electronic device can have software applications which allow for advanced user voice controls over the electronic device such as voice control software or can have software applications allowing music playback of MP3s or music streaming. Such features and/or functionality can be transferred to the eyewear unit 510, to the modular unit 550, and/or to the eyewear unit 510 via the modular unit 550 or vice versa. The second remote unit 582 and third remote unit 584 can be other types of devices having less advanced processing capabilities such as, but not limited to, watches and sensors that can be worn by the wearer elsewhere on the wearer's body. It should be appreciated that the eyewear unit 510 and/or modular unit 550 can wirelessly communicate with remote units 580, 582, 584 via the same or different wireless protocols. As noted above, in some embodiments, the user can have an array of different remote units, such as but not limited to multiple single-purpose remote units each with a different sensor, so that the wearer can select one or more desired remote units to connect to the eyewear unit 510 to customize the nature of the data to the activity being performed by the wearer.

In some embodiments, the modular unit can be in wireless communication with some or all of the remote units. Moreover, in some embodiments, the modular unit can be in communication with additional modular units (not shown). In some embodiments, the eyewear unit need not be in communication with some or all of the modular and/or remote units such as remote units. As shown in the illustrated embodiment, the modular unit can be in communication with some or all of the remote units.

Figure 4:
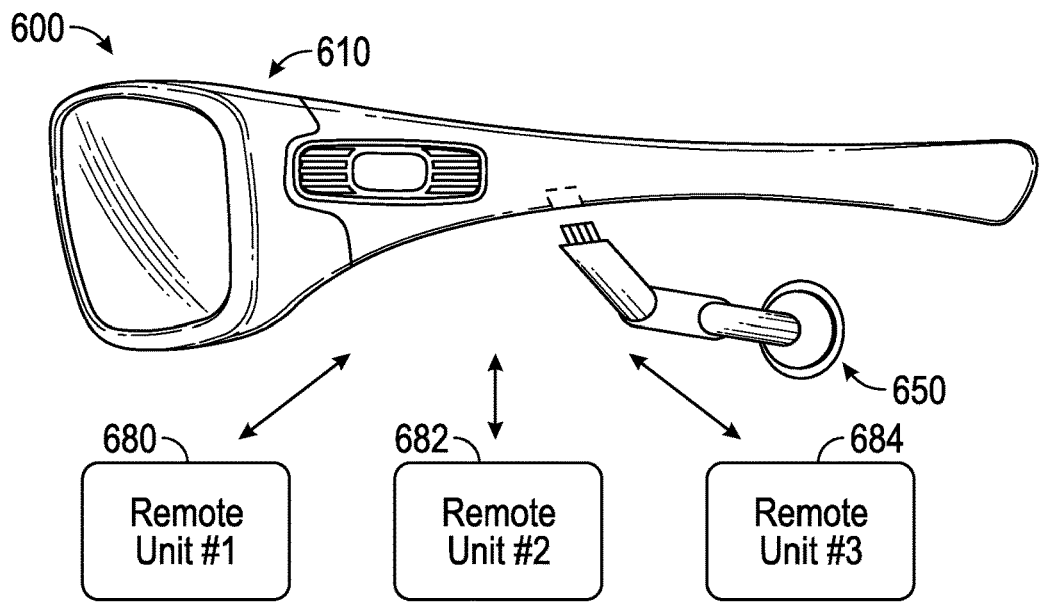
FIG. 4 illustrates a schematic of another embodiment of an electronic device or system in communication with multiple remote units, the system having an eyewear unit and a modular unit.

With reference now to the embodiment of the electronic device or system 600, such as a wearable device or system. The wearable device or system can be a network or communication device or system. As illustrated in FIG. 4, the system 600 can be similar to system 500. As such, the system 600 can include both an eyewear unit 610 and a modular unit 650 which can be removably coupled to the eyewear unit 610. The eyewear unit 610 and modular unit 650 can be similar to eyewear unit 510 and modular unit 550. As shown in the illustrated embodiment, the eyewear unit 610 and/or modular unit 650 can wirelessly communicate with one or more remote units such as first, second and third remote units 680, 682, 684. The first, second and third remote units 680, 682, 684 can be devices having less advanced processing capabilities such as, but not limited to, sensors. In some embodiments, the user can have an array of different remote units, such as but not limited to multiple single-purpose remote units, each with a different sensor, so that the wearer can select one or more desired remote units to connect to the eyewear unit 610 to customize the nature of the data to the activity being performed by the wearer. It should be appreciated that the system 600 can be used as a standalone unit without electronic devices with advanced processing capabilities such as smartphones, PDAs, and tablets. Rather, in some embodiments, such advanced processing capabilities can already be provided on the eyewear unit 610 and/or modular unit 650.

Embodiments of Input/Output Systems

Figure 5A:
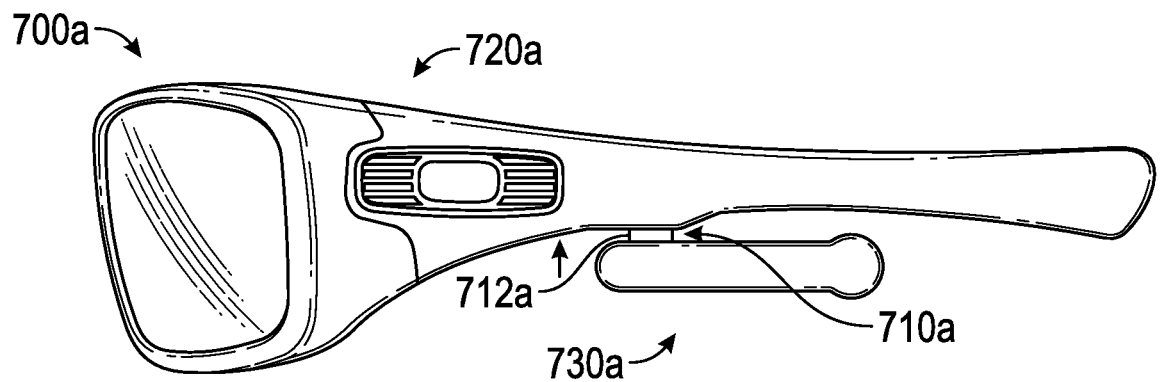
FIG. 5A illustrates a left side view of an embodiment of an electronic device or system having an eyewear unit with an input/output system.
Figure 5B:
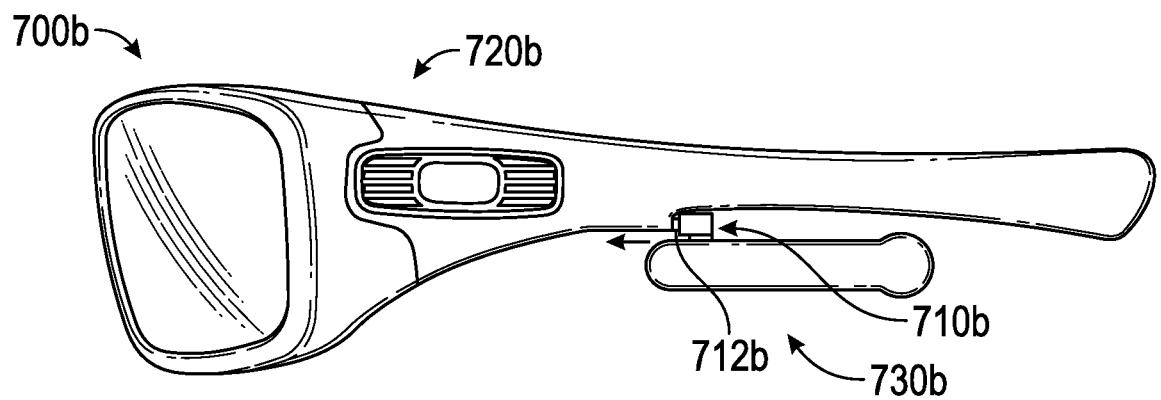
FIG. 5B illustrates a left side view of another embodiment of an electronic device or system having an eyewear unit with an input/output system.
Figure 5C:
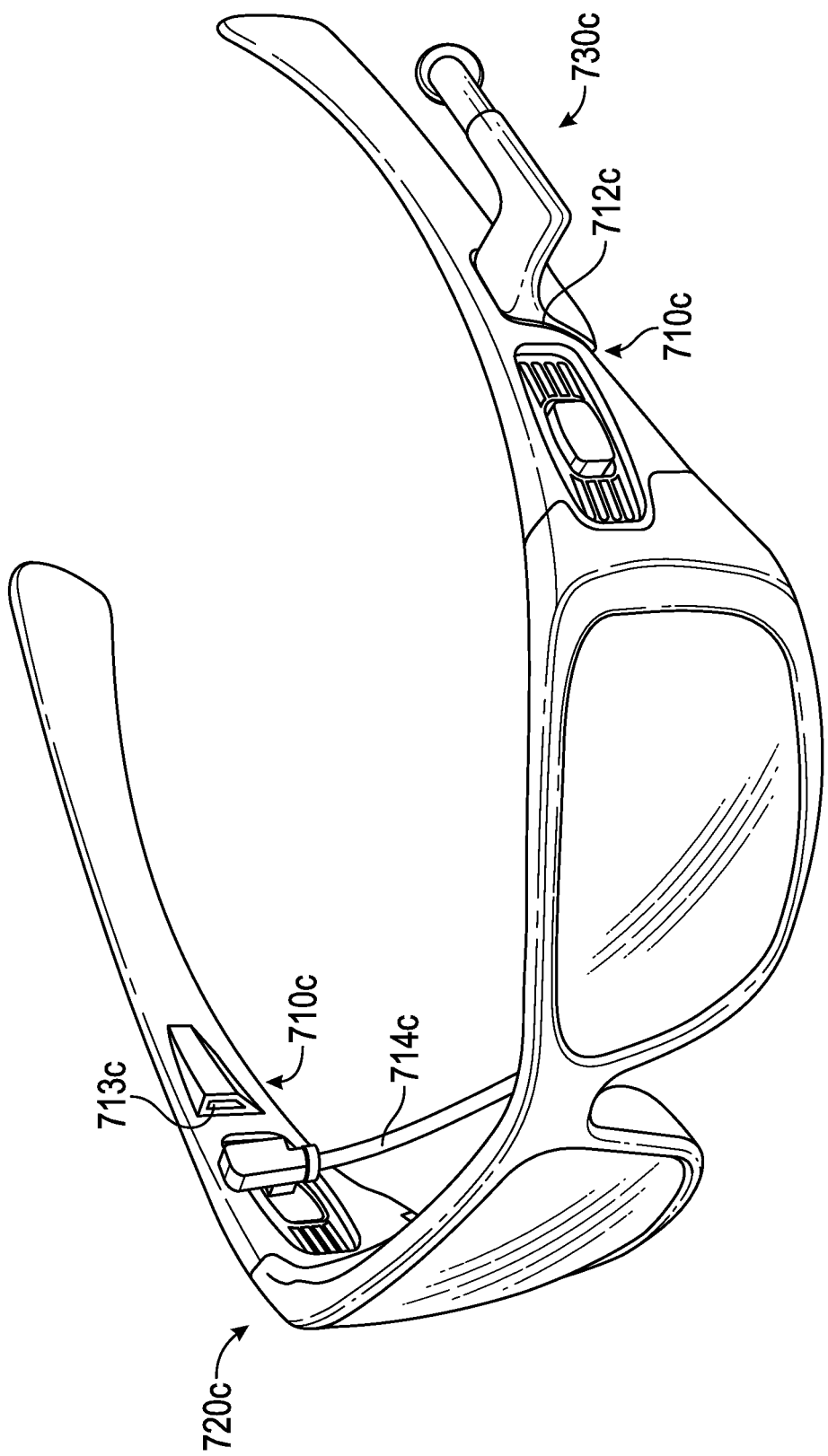
FIG. 5C illustrates a front perspective view of another embodiment of an electronic device or system having an eyewear unit with an input/output system.

With reference now to the embodiments of electronic devices or systems 700a, 700b, 700c, such as wearable devices or systems. The wearable device or system can be a network or communication device or system. As illustrated in FIGS. 5A-5C, the systems 700a, 700b, 700c can include I/O systems 710a, 710b, 710c, in the form of portion 712a, 712b, 712c, 713c to allow the user to connect the eyewear units 720a, 720b, 720c to modular units 730a, 730b, 730c. As shown in the illustrated embodiments, the ports 712a, 712b, 712c, 713c can be placed at various locations of the eyewear thereby providing vertical attachment as shown with port 712a, anterior-posterior attachment as shown with portion 712b, lateral attachment as shown in port 712c, and internal attachment as shown with port 713c. The ports 712a, 712b, 712c, 713c can be oriented at any other angle, including between about 0 degrees (vertical) and about 360 degrees, between about 0 degrees (vertical) and about 90 degrees (anterior-posterior), about 30 degrees, about 45 degrees (see for example FIGS. 9A-B), and any other range of degrees within these ranges. As shown in FIG. 5C, a wire 714c can be used to facilitate connection with the ports.

Embodiments of Modular Units

Figure 6:
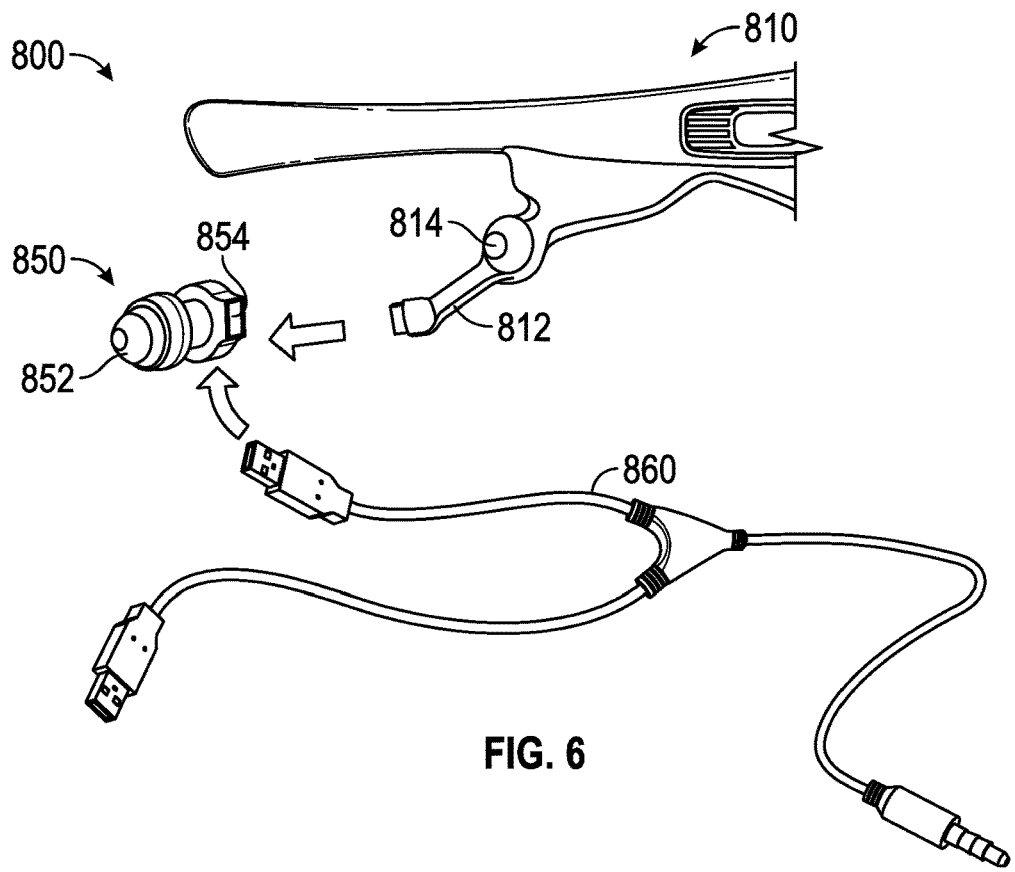
FIG. 6 illustrates a schematic view of an embodiment of an electronic device or system having an eyewear unit and a modular unit, the modular unit being removably attachable with other peripherals.

With reference now to the embodiment of the electronic device or system 800, such as a wearable device or system. The wearable device or system can be a network or communication device or system. As illustrated in FIG. 6, the system 800 can be designed to obtain, process, and/or convey data to a user of the system 800 similar to the systems described herein, such as systems 100, 500, 600, 700a-c. The system 800 can include both an eyewear unit 810 and a modular unit 850 which can be removably coupled to the eyewear unit 810.

As shown in the illustrated embodiment, the eyewear unit 810 can include a connector 812, such as a USB 3.0 Type-C connector, positioned at an end of a moveable arm 814, and can be configured to communicate using any of the features or capabilities associated with the protocols for such connector or any other suitable connector. The moveable arm 814 can be moveable relative to the other portions of the eyewear unit 810. For example, as shown in the illustrated embodiment, the other end of the moveable arm 814 can be pivotally coupled to the remaining portions of the eyewear unit 810 such that the moveable arm 814 can rotate relative to the remaining portions of the eyewear unit 810. In some embodiments, the moveable arm 814 can translate relative to the remaining portions of the eyewear unit 810.

As shown in the illustrated embodiment, the modular unit 850 can be used in connection with not only the eyewear unit 810 but also other devices. For example, the modular unit 850 can be used with an audio capable 860 for connection to other devices, such as an audio device. As shown in the illustrated embodiment, both the eyewear unit 810 and the audio cable 860 can connect to the modular unit 850 via a port 854. The modular unit 850 can include an in-ear or mid-ear speaker 852. In order to removably couple the modular unit 850 to the eyewear unit 810, the modular unit 850 can include a port 854 such as a USB 3.0 Type-C port. As shown in the illustrated embodiment, the port 854 can be used to connect the modular unit 850 to other devices, such as an audio cable 860, to allow the modular unit 850 to be used with other types of devices. Accordingly, the speaker 852 of the modular unit 850 can be used as headphones, for example, and can be used with other devices such as, but not limited to, audio/video players and smartphones.

Figure 7:
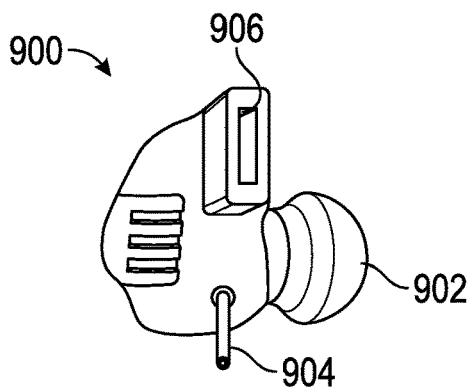
FIG. 7 illustrates a perspective view of an embodiment of a modular unit having a pitot tube.
Figure 8:
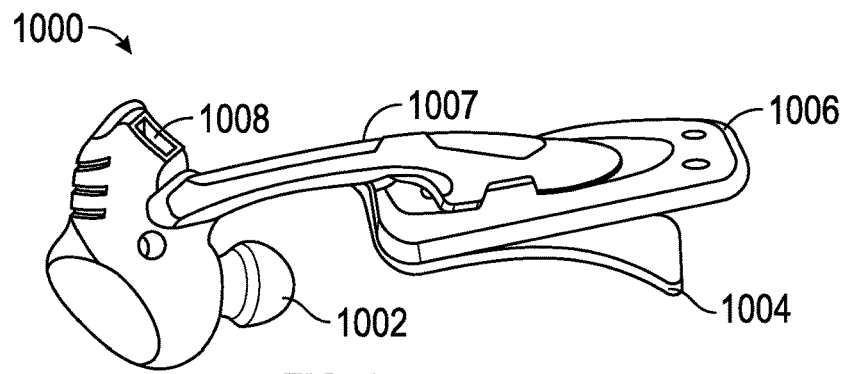
FIG. 8 illustrates a perspective view of an embodiment of a modular unit having a biometric sensor.

Any of the modular units described herein can include one or more functionalities. For example, as shown in the embodiment of FIG. 7, the modular unit 900 can include an audio signal conversion system and a sensor system. The modular unit 900 can include an in-ear or mid-ear speaker 902 and/or a wind speed sensor 904 in the form of a pitot tube, for example. In some embodiments, in order to removably couple the modular unit 900 to an eyewear unit, such as eyewear unit 810, the modular unit 900 can include a port 906 such as a USB 3.0 Type-C port. As another example, as shown in the embodiment of FIG. 8, the modular unit 1000 can include an in-ear or mid-ear speaker 1002 as well as a biometric sensor 1004 in the form of a biometric tape placed on a panel 1006. As shown in the illustrated embodiment, the modular unit 1000 can include a moveable arm 1007. In some embodiments, in order to removably couple the modular unit 1000 to an eyewear unit, such as eyewear unit 810, the modular unit 1000 can include a port 1008 such as a USB 3.0 Type-C port.

Figure 9A:
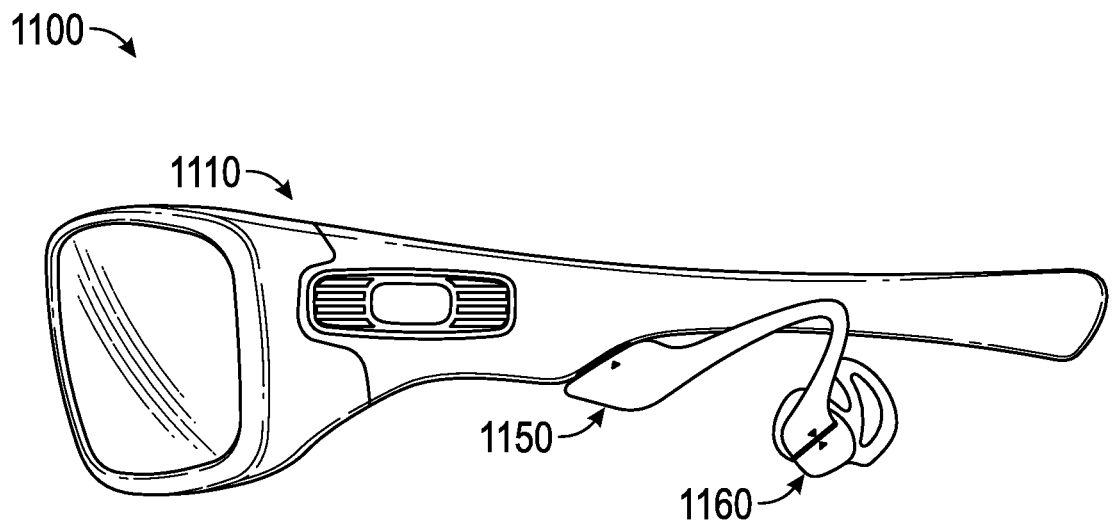
FIG. 9A illustrates a schematic view of another embodiment of an electronic device or system having an eyewear unit and a plurality of modular units in an attached configuration.
Figure 9B:
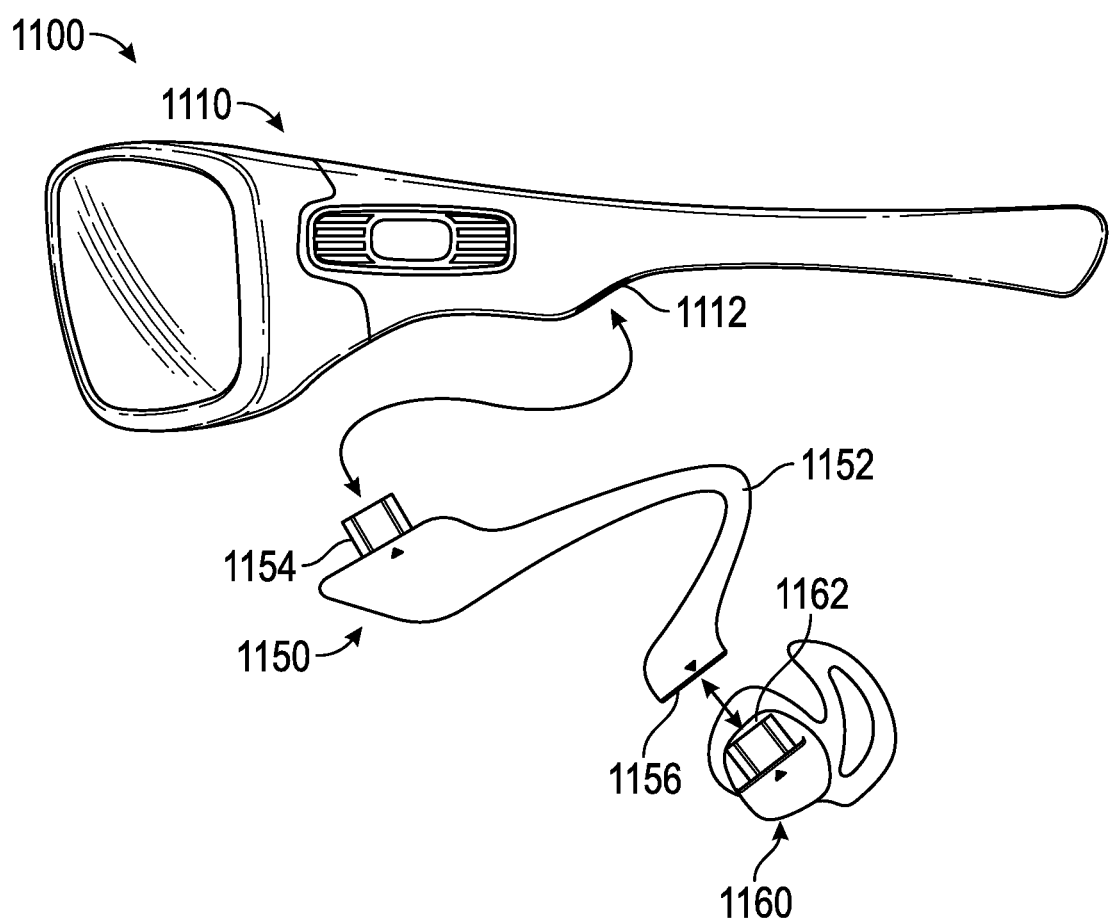
FIG. 9B illustrates a schematic view of the device or system of FIG. 9A in a detached configuration.

Any of the modular units described herein can include multiple ports and/or connectors. For example, in some embodiments, the modular unit can include a first port and/or connector attached to an eyewear unit and a second port and/or connector attached to another modular unit. This can provide additional advantages for a user by allowing an even greater degree of customizability of the eyewear system. Such customization can include the ability to use particular modular units to obtain a fit which is best suited for the wearer. For example, reference is made to the embodiment of the electronic device or system 1100, such as a wearable device or system. The wearable device or system can be a network or communication device or system As illustrated in FIGS. 9A-B, the system 1100 can include an eyewear unit 1110, a modular unit 1150 in the form of a boom, and a second modular unit 1160 in the form of an earbud. This can advantageously allow a greater range of interchangeability. For example, by providing a modular unit 1150 in the form of a boom, a user of the device can interchange the modular unit 1150 to better fit the user's preference, such as a different shape or material, so that the modular unit 1160 can be more comfortably positioned with respect to the user.

As shown in the illustrated embodiment, the boom 1150 includes body 1152. In some embodiments, the body 1152 can be formed from a resilient or flexible material. The resilient or flexible material can be sufficiently rigid such that it maintains a deformed shape after deformation. This can allow the shape of the body 1152 to be altered by the user to attain a better fit. In some embodiments, the resilient or flexible material can be designed to return to its prior shape after some degree of deformation.

In some embodiments, modular units 1150, 1160 can incorporate any of the systems and components described herein such as processing system 220, signal conversion system 230, sensor system 240 (ambient or environmental, motion, biometric, and/or physiological), input/output (I/O) system 250, user interface system 260, and/or power system 270. For example, in some embodiments, modular unit 1150 can include an input/output system. This input/output system can be used, in some embodiments, to provide communication between the eyewear unit 1110 and the modular unit 1160. In this manner, the eyewear unit 1100 can receive communications from one or both of the modular units 1150, 1160, the modular unit 1150 can receive communications from one or both of the eyewear unit 1100 and modular unit 1160, and/or the modular unit 1160 can receive communications from one or both of the eyewear unit 1100 and the modular unit 1150. As shown in the illustrated embodiment, the body 1152 has a connector 1154 at one end for attachment to a port 1112 of the eyewear unit 1110 and a port 1156 at a second end for receiving a connector 1162 of the modular unit 1160. In some embodiments, modular unit 1150 can include a processing system and/or sensor system similar to those described herein. For example, the modular unit 1150 can include a heart rate sensor and an accelerometer.

Figure 10:
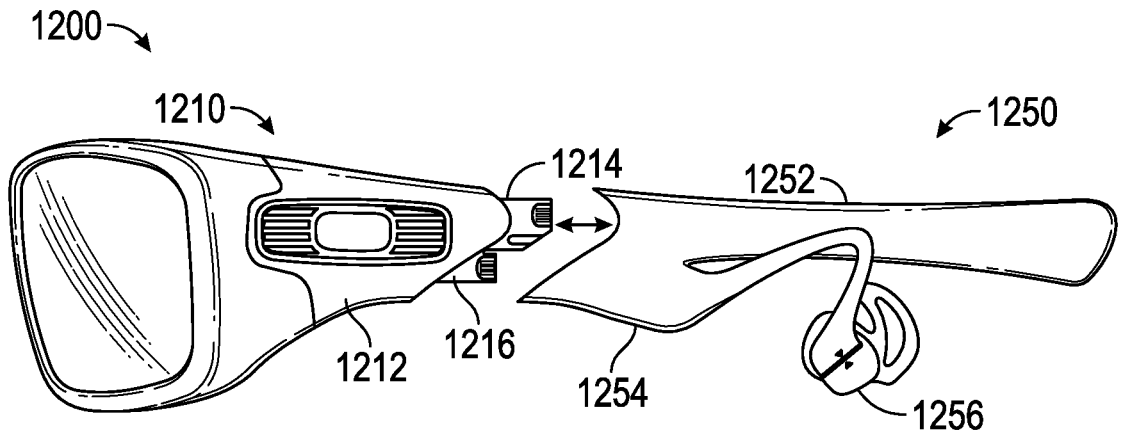
FIG. 10 illustrates a left side view of another embodiment of an electronic device or system having an eyewear unit and modular unit, the modular unit forming part of an earstem.

With reference now to the embodiment of the electronic device or system 1200, such as a wearable device or system. The wearable device or system can be a network or communication device or system. As illustrated in FIG. 10, in some embodiments, the modular unit 1250 can form at least a portion of the eyewear unit 1210 for supporting the eyewear unit 1210 on a user. As shown in the illustrated embodiment, the eyewear unit 1210 can include a partial earstem 1212 having one or more connectors 1214, 1216 onto which the modular unit 1250 can be connected. As shown in the illustrated embodiment, the modular unit 1250 can form a posterior portion of the earstem and can include an earstem portion 1252 with an integrated boom 1254. In some embodiments, the earstem portion 1252 and/or the integrated boom 1254 can be formed from a resilient or flexible material. The resilient or flexible material can be sufficiently rigid such that it maintains a deformed shape after deformation. This can allow the shape of the earstem portion 1252 and/or integrated boom 1254 to be altered by the user to attain a better fit. In some embodiments, the resilient or flexible material can be designed to return to its prior shape after some degree of deformation. As shown in the illustrated embodiment, another modular unit 1256, such as an earbud, can be removably attached to the integrated boom 1254. In some embodiments, modular units 1250, 1256 can incorporate any of the systems and components described herein such as processing system 220, signal conversion system 230, sensor system 240 (ambient or environmental, motion, biometric, and/or physiological), input/output (I/O) system 250, user interface system 260, and/or power system 270. In some embodiments, electronics can be contained within the earstem portion 1252 and/or the boom 1254.

While the modular unit 1250 incorporates an earstem portion 1252 and an integrated boom 1254, in some embodiments the boom 1254 can be separate from the earstem portion 1252. This can advantageously allow for a greater degree of modularity of components of the system 1200. For example, the boom 1254 can be removably attachable to the earstem portion 1252 and/or the eyewear unit 1210. In some embodiments, the second modular unit 1256 can be integrated with the boom 1254 and/or the earstem portion 1252. In some embodiments, different modular units can include different shapes of earstems allowing a user to choose a modular unit which can provide a more comfortable fit. While the illustrated system 1200 includes a modular unit 1250 which forms a posterior portion of an earstem, the modular unit 1250 can be designed such that it forms any other portion of the earstem including the anterior portion, a middle portion, and/or the entirety of the earstem.

In some embodiments, the modular unit can form other portions of an eyewear. For example, the modular unit can be designed such that it functions as a nosepiece for the eyewear. In some embodiments, the modular unit can be designed such that it functions as a portion of the face of the eyewear such as a portion of the orbitals, the brow, an earsock, and/or a decorative element such as an icon.

Figure 11:
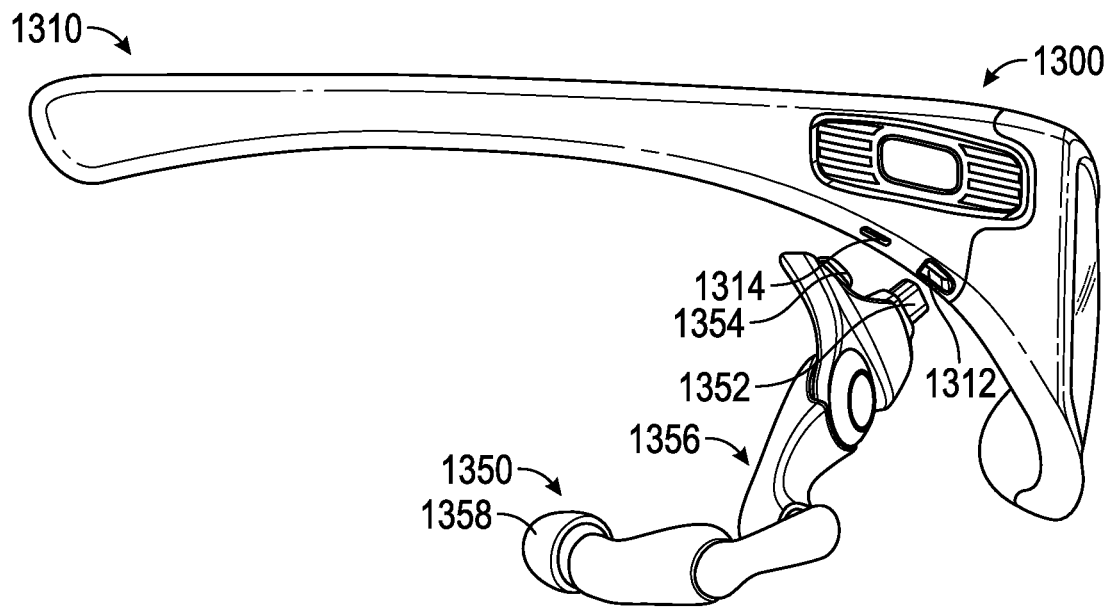
FIG. 11 illustrates a rear perspective view of another embodiment of an electronic device or system having an eyewear unit and modular unit.
Figure 12:
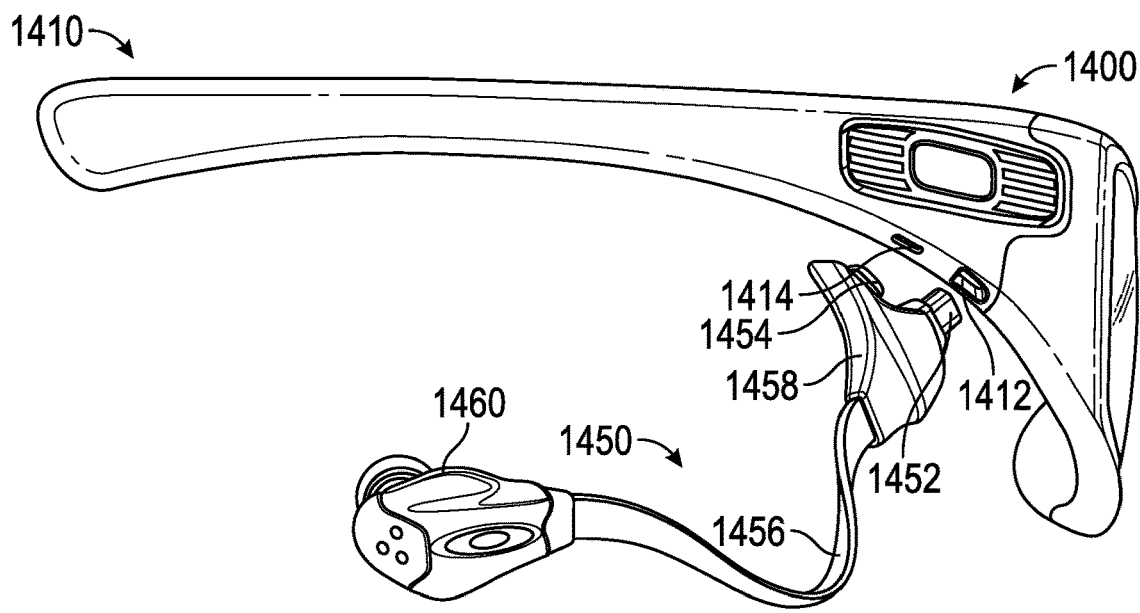
FIG. 12 illustrates a rear perspective view of another embodiment of an electronic device or system having an eyewear unit and modular unit.
Figure 13A:
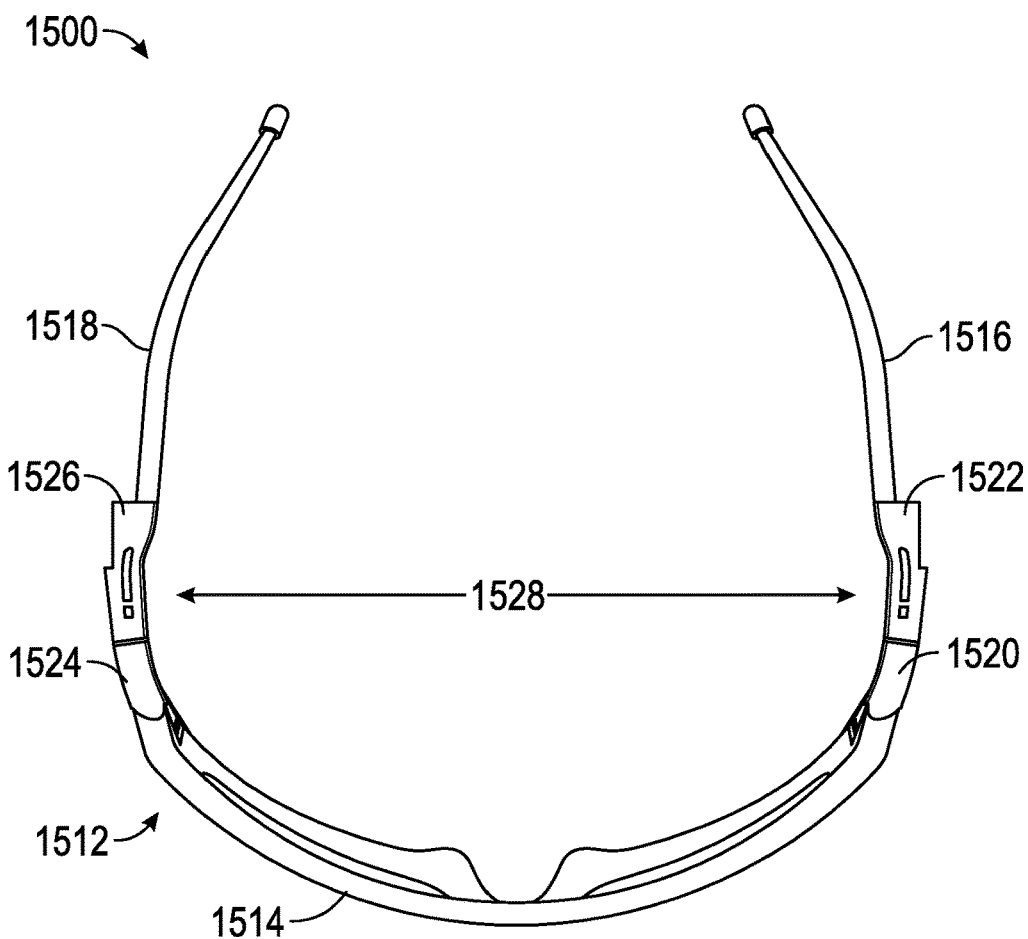
FIG. 13A illustrates a top view of a schematic of an embodiment of a frame of an eyewear unit.
Figure 13B:
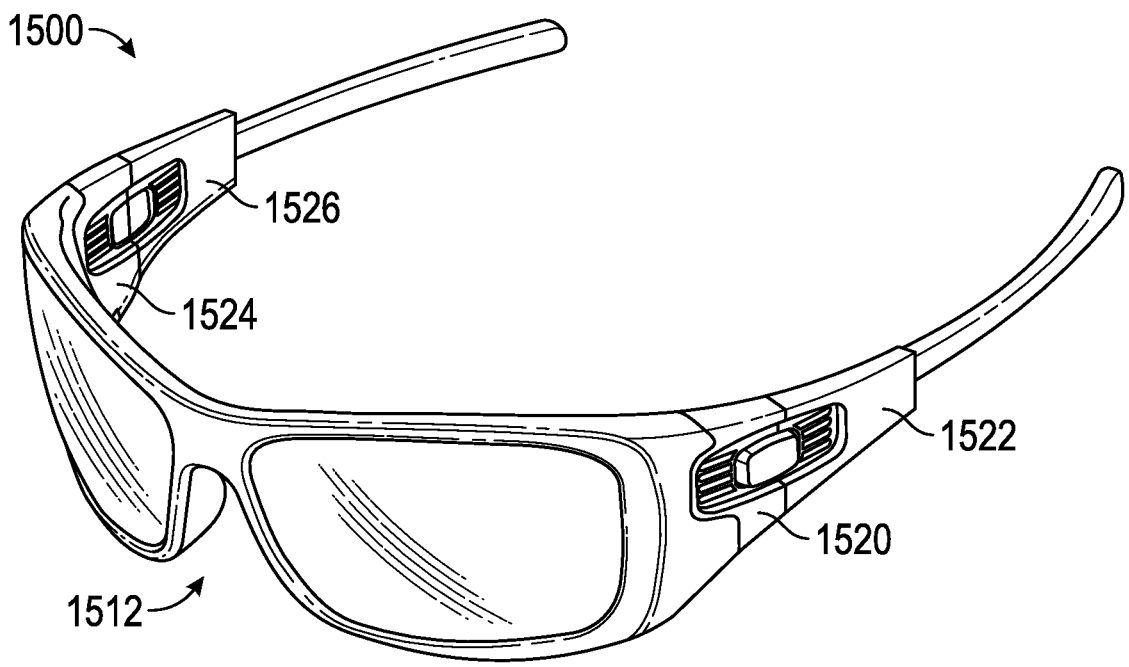
FIG. 13B illustrates a front perspective view of the schematic of the frame of FIG. 13A.
Figure 13C:
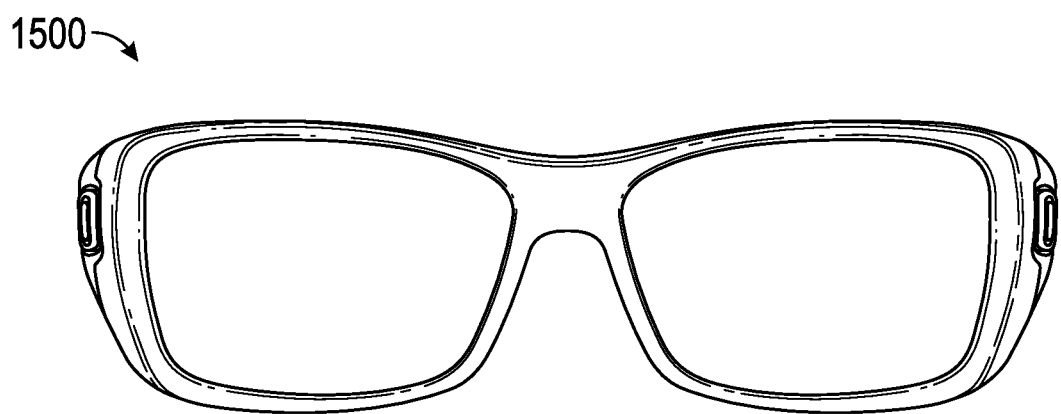
FIG. 13C illustrates a front view of the schematic of the frame of FIG. 13A.
Figure 13D:
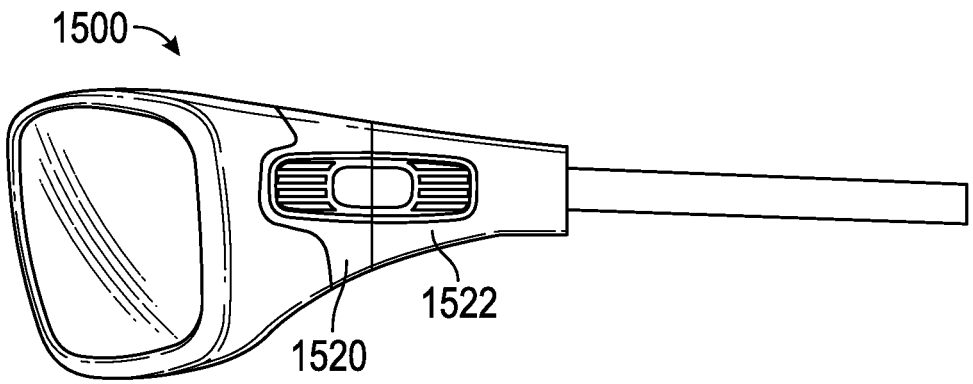
FIG. 13D illustrates a left side view of the schematic of the frame of FIG. 13A.

With reference now to the embodiment of the electronic device or system 1300, such as a wearable device or system. The wearable device or system can be a network or communication device or system. As illustrated in FIG. 11, the system 1300 can include an eyewear unit 1310 and a modular unit 1350. As shown in the illustrated embodiment, the eyewear unit 1310 can include a port 1312 such as a USB 3.0 Type-C port for receiving a corresponding connector 1352 such as a USB 3.0 Type-C connector of the modular unit 1350. Other types of ports 1312 and/or connectors 1352 can be used, such as those described herein. The eyewear unit 1310 can include one or more couplings 1314, such as protrusions, to receive one or more couplings 1354, such as complementary protrusions, of the modular unit 1350. These couplings 1314, 1354 can provide a more secure connection between the eyewear unit 1310 and the modular unit 1350 and can reduce the stress applied to the port 1312 and connector 1352. In some embodiments, couplings 1314, 1354 may be snap-fit mechanical couplings. As shown in the illustrated embodiment, the modular unit 1350 can include a boom 1356, which includes one or more movable arms, to allow a user to properly position a portion of the modular unit 1350, such as the speaker 1358, with respect to the user. For example, in some embodiments the movable arms can be articulating arms which include one or more movable joints. In some embodiments, one or more components of the processing system 220, the signal conversion system 230, the sensor system 240, the input/output system 250, the user interface system 260, the power system 270, and/or any other components can be positioned within the movable arms of the boom 1356 of the modular unit 1350 or any other portion of the modular unit 1350. In some embodiments, two or more ports and/or two or more connectors can be used. For example, in some embodiments, a first port and connector can be used for power transmission between the eyewear unit 1310 and the modular unit 1350, and a second port and connector can be used for data transmission between the eyewear unit 1310 and the modular unit 1350. In some embodiments, port 1312 and connector 1352 can be used for data transmission and couplings 1314, 1354 can be replaced with a port and connector for power transmission. In some embodiments, two or more couplings can be used.

With reference now to the embodiment of the electronic device or system 1400, such as a wearable device or system. The wearable device or system can be a network or communication device or system. As illustrated in FIG. 13, the system 1400 can include an eyewear unit 1410 and a modular unit 1450. As shown in the illustrated embodiment, the eyewear unit 1410 can include a port 1412 such as a USB 3.0 Type-C port for receiving a corresponding connector 1452 such as a USB 3.0 Type-C connector of the modular unit 1450. The eyewear unit 1410 can include one or more couplings 1414, such as protrusions, to receive one or more couplings 1454, such as complementary protrusions, of the modular unit 1450. In some embodiments, couplings 1414, 1454 may be snap-fit mechanical couplings. As shown in the illustrated embodiment, the modular unit 1450 can include two or more components 1458, 1460 attached via a link 1456. As shown in the illustrated embodiment, the link 1456 can be semi-rigid or flexible such as a flexible, flat wire. In some embodiments, one or more components of the processing system 220, the signal conversion system 230, the sensor system 240, the input/output system 250, the user interface system 260, the power system 270, and/or any other components can be included with the components, such as component 1458, 1460, and/or link 1456 of the modular unit 1450. For example, the component 1460 can include components such as one or more speakers. The component 1458 can include components such as one or more connectors 1452. In some embodiments, two or more components, such as components 1458, 1460, can be separable and can, in some embodiments, allow the components to be used in conjunction with other devices. For example, the component 1460 can be detached and used as a speaker for other electronic devices. In some embodiments, two or more ports and/or two or more connectors can be used. For example, in some embodiments, a first port and connector can be used for power transmission between the eyewear unit 1410 and the modular unit 1450, and a second port and connector can be used for data transmission between the eyewear unit 1410 and the modular unit 1450. In some embodiments, port 1412 and connector 1452 can be used for data transmission, and couplings 1414, 1454 can be replaced with a port and connector for power transmission. In some embodiments, two or more couplings can be used.

As discussed above in connection with FIG. 1, any of the modular units discussed herein can include one or more components of the processing system 220, the signal conversion system 230, the sensor system 240, the input/output system 250, the user interface system 260, the power system 270, and/or any other components. In some embodiments, the modular units can include one or more sensors such as those described in connection with sensor system 140, including, but not limited to, motions sensors designed to detect and/or measure movement or motion such as an accelerometer, a gyroscope, a cadence sensor, a speed sensor, a pedometer, and/or any other types of sensors, physiological sensors designed to detect and/or measure one or more physiologic parameters of the user such as a heart rate sensor, a heart rate sensor, a blood pressure sensor, a blood sugar sensor, and a blood-oxygen and/or blood $CO_2$ sensor, sensors for monitoring hydration levels and temperature of a user such as a perspiration sensor, a skin resistivity sensor, a hydration sensor, a dermal moisture sensor, an electrolyte sensor, and a body temperature sensor, and/or any other types of sensors, such as a lactic acid sensor and $pO_2$ sensor, and environmental sensors designed to detect and/or measure parameters of the surrounding environment, such as an air temperature sensor, an air humidity sensor, a pressure sensor, an altitude sensor (such as an altimeter), an oxygen sensor, an air quality sensor, a wind speed sensor (such as a pitot tube), a solar irradiance sensor, a proximity sensor such as a sonar device, a magnetometer, and any other sensor which can detect parameters of the surrounding environment. The modular units can include a microphone to determine ambient noise and use such information in a noise-reduction or cancellation system. In some embodiments, the noise-reduction or cancellation system can be used in conjunction with a voice command system. This can advantageously increase the effectiveness of the voice command system in determining the specific commands given by the wearer. In some embodiments, the modular units can include components, software and/or firmware to communicate with the eyewear unit to allow the eyewear unit to determine the type of components included with the modular unit.

Examples of Structural Support for or Packaging of Components

With reference now to the embodiment of the electronic device or system 1500 of FIGS. 13A-D, the system 1500 can include an eyewear unit 1510 having a frame 1512 on which one or more components can be mounted and/or attached. The one or more components can be any of those described in connection with any of the embodiments described herein including but not limited to the system 100. For example, the components can include any of those components discussed in connection with the processing system 120, the signal conversion system 130, the sensor system 140, the input/output system 150, the user interface system 160, the power system 170, and/or any other components as desired. These components can form part of the eyewear unit 1510, similar to other eyewear units described herein, and can be used in conjunction with one or more modular units and/or remote units. The components can be mounted and/or attached using any of a variety of techniques including fastening the components to the frame 1512 via mechanical fasteners such as screws, bolts, rivets, clamps, and the like, chemical fasteners such as adhesives and the like, press fits, or can simply be maintained in place via use of other components of the eyewear unit 1510.

As shown in the illustrated embodiment, the frame 1512 can include a front face 1514, a left earstem 1516, and a right earstem 1518. In some embodiments, the eyewear includes dual lenses or a unitary lens, an orbital partially or completely surrounding the lenses or lens, and/or a rimless or frameless front face (e.g., with the lens or lenses attached to the earstems without a front frame). In some embodiments, the components can be mounted and/or attached to the front face 1514 (e.g., frame and/or lens or lenses), the left earstem 1516, and/or the right earstem 1518. For example, as shown in the illustrated embodiment, one or more components, such as a first component 1520 and a second component 1522, can be attached to the left earstem 1516 and one or more components, such as a third component 1524 and a fourth component 1526 can be attached to the right earstem 1518. As shown in the illustrated embodiment, components 1522 and/or 1526 can include a port and/or connector such as those described herein including, but not limited to, a USB 3.0 Type-C port. Components 1520 and/or 1524 can be parts of other systems described herein including a processing system, a signal conversion system, a sensor system, an input/output system, a user interface system, and/or a power system. Fewer or greater number of components can be mounted and/or attached to the frame 1512 and the positioning of the components relative to each other can be changed. For example, in some embodiments, components can be attached and/or mounted to the front face 1514 such as, but not limited to, the nosepiece portion.

The components can be electrically coupled to allow the components to communicate with each other. In some embodiments, one or more of the components can be directly coupled electrically. The eyewear unit 1510 can include an electrical connector, such as a wire, for directly coupling two or more components together. The electrical connector can run along any surface of the eyewear unit 1510 such as, but not limited to, the top surfaces of the frame 1512. In some embodiments, one or more components can be indirectly coupled electrically. For example, the one or more components can be coupled via a wireless connection such as, but not limited to, Bluetooth, Bluetooth Low Energy (Bluetooth Smart), ANT, ANT+, ZigBee, Wi-Fi, GSM, CDMA, and MMS.

In some embodiments, the first component 1520 can include one or more components such as those used for the processing system 120, the signal conversion system 130, the sensor system 140, the input/output system 150, the user interface system 160, and/or the power system 170. For example, the first component 1520 can include one or more circuit boards on which a processor 122, memory 124, one or more receivers 154, one or more transmitters 156 (or transceivers), and/or one or more sensors such as an accelerometer can be included. The circuit board can be sized to fit within a frame of the eyewear unit 1510.

In some embodiments, the third component 1524 can include a battery or other component from the power system 170. In some embodiments, the battery can be chosen such that the eyewear unit 1510 can operate for about four hours. In some embodiments, the battery can be chosen such that it can operate for a greater or lesser duration than four hours, including between about 1 hour and about 10 hours, any duration within this range, and any other duration as desired. In some embodiments, the battery can have a relatively compact form factor and be sized to fit within a frame of the eyewear unit 1210. In some embodiments, the eyewear unit 1510 can include components to enable wired charging, such as via USB, and/or wireless charging, such as via inductive charging, of the battery.

In some embodiments, the eyewear unit 1510 can include a housing which can form at least part of an outer housing for the components and can serve as a mounting structure for a user interface system such as those described herein.

Movable Antenna

Figure 14:
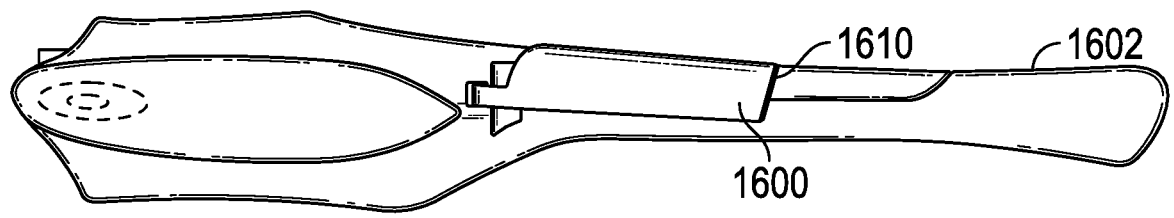
FIG. 14 illustrates a side view of an embodiment of an antenna attached to an earstem.
Figure 15:
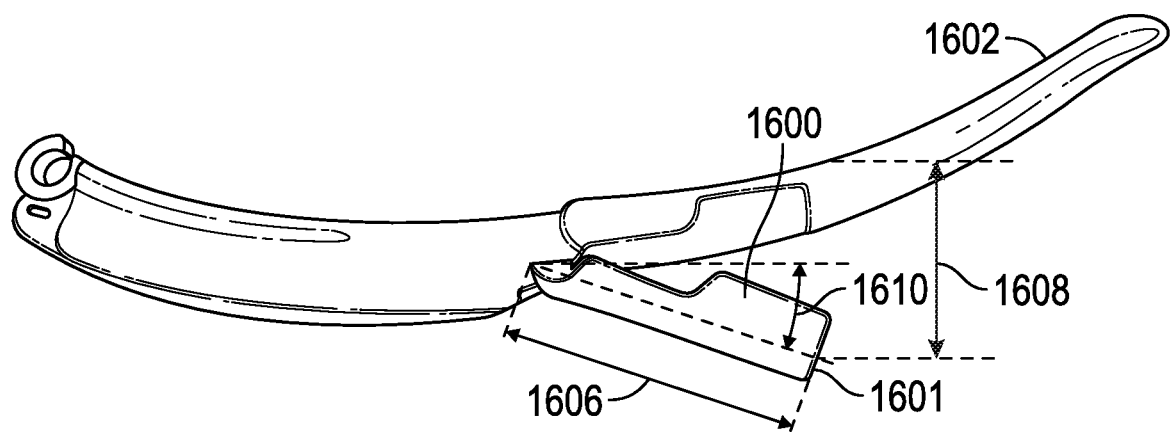
FIG. 15 illustrates a top view of the antenna of FIG. 14.

With reference now to the embodiment of the antenna 1600 of FIGS. 14 and 15, the antenna 1600 can be attached to a component of an electronic device or system including, but not limited to, electronic device or systems 100, 500, 600, 700a-c, 800, 1100, 1200, 1300, 1400, 1500. As shown in the illustrated embodiment, the antenna 1600 can be attached to a portion of an earstem 1602, such as an outer surface of the earstem 1602 with a portion of the antenna 1602 extending partially over a top surface of the earstem 1602. In some embodiments the antenna 1600 can be positioned and/or attached to any portion of an eyewear unit, such as eyewear units 110, 510, 610, 810, 1100, 1210, 1310, 1410, 1510, including, but not limited to, portions of a face or frame such as a nosepiece region or nosepad, lateral regions of the face or frame, a brow, and/or orbital regions, portions of an earstem such as an anterior region of the earstem, a posterior region of the earstem, a bottom surface of the earstem, a top surface of the earstem, an outer surface of the earstem, and/or an inner surface of the earstem, and/or portions of a lens such as a periphery of the lens, an anterior surface of the lens, and/or a posterior surface of the lens. In some embodiments, the antenna 1600 can be positioned and/or attached to any portion of a modular unit, such as modular units 210, 550, 650, 730a, 730b, 730c, 850, 900, 1000, 1150, 1160, 1250, 1256, 1350, 1450. In some embodiments, the antenna 1600 can be positioned and/or attached to any portion of a remote unit, such as remote units 310, 580, 582, 584, 680, 682, 684.

The antenna 1600 can be movably attached to the earstem 1602 such that at least a portion of the antenna 1600 can translate and/or rotate relative to the earstem 1602. For example, in some embodiments, the entirety of the antenna 1600 can translate relative to the earstem 1602 or a portion of the antenna 1600 can translate relative to the earstem 1602 such as via telescoping. In embodiments where the antenna 1600 is attached to other portions of system, such as other portions of the eyewear unit, the modular unit, and/or the remote unit, the antenna 1600 can translate and/or rotate relative to such portions of the system. The antenna 1600 can be rotated from a first or stowed configuration (not shown) in which the antenna 1600 is positioned closer to the earstem 1602 to a second or deployed configuration as shown in which at least a portion of the antenna 1600 is positioned away from the earstem 1602. The first or stowed configuration can beneficially reduce the form factor of the antenna 1600 and component to which it is attached. This can reduce the likelihood that the antenna 1600 and/or the component to which it is attached is damaged when being stored. For example, the antenna 1600 can be positioned in the first or stowed configuration such that the antenna 1600 is generally flush with the earstem 1602. The second or deployed configuration can beneficially enhance the performance of the antenna 1600. The antenna 1600 can be configured to receive one or more electronic signals including, but not limited to, Bluetooth, Bluetooth Low Energy (Bluetooth Smart), ANT, ANT+, ZigBee, Wi-Fi, GSM, CDMA, MMS, and/or any other type of signal. In some instances, signal degradation may occur and/or noise may be generated as a result of positioning the antenna 1600 near a user's head. Such signal degradation and/or noise may be reduced, or generally eliminated, by positioning the antenna further from a user's head. This can beneficially enhance the signal received by electronics. For example, enhanced signals can beneficially increase the accuracy of data provided by a GPS receiver. Such enhanced signals can also be beneficial for reception and/or transmission of other types of signals, such as those utilized by Bluetooth and/or WiFi receivers, transmitters, and/or transceivers.

As shown in the illustrated embodiment, the antenna 1600 can rotate relative to the earstem 1602 along a generally vertical or superior-inferior axis of rotation when worn by a user along a coupling 1604. The length 1606 of the antenna 1600 can be between approximately 10 mm to approximately 60 mm, between approximately 15 mm to approximately 50 mm, between approximately 20 mm to approximately 40 mm, approximately 30 mm, any sub-range within any of these ranges, or any other length to receive a desired signal. In the deployed configuration the antenna 1600 can be positioned such that a distance 1608 between at least a portion of the antenna 1600, such as an end 1601, and a user's head can be between approximately 5 mm to approximately 55 mm, between approximately 10 mm to approximately 40 mm, between approximately 15 mm to approximately 25 mm, approximately 15 mm, any sub-range with any of these ranges, or any other distance to reduce signal degradation and/or noise based on the received signal. In some embodiments, the distance 1608 can be between approximately one-fourth to three-fourths the length 1610 of the antenna 1600, between approximately one-third to two-thirds the length 1610 of the antenna 1600, approximately one-half the length 1610 of the antenna 1600, any sub-range within these ranges, or any other ratio as desired. In the deployed configuration the antenna 1600 can be positioned such that an angle 1610 between the antenna 1600 and the longitudinal axis of the earstem at that point is between approximately 10 degrees to approximately 90 degrees, between approximately 25 degrees to approximately 75 degrees, between approximately 40 degrees to approximately 60 degrees, approximately 45 degrees, any sub-range within these ranges, or any other angle as desired.

While the coupling 1604 as shown allows rotation along a generally vertical or superior-inferior axis of rotation, in some embodiments the coupling 1604 can allow for rotation along one or more other axes including but not limited as a horizontal axis including such as a longitudinal axis of the earstem 1602. In some embodiments, the coupling 1604 can be a pin hinge, a "scissor door" hinge, a single shear hinge, a double shear hinge, a spherical hinge, a ball-and-socket hinge, a floating hinge, a scissor hinge, any other hinge or coupling which can allow for one or more translational and/or rotational degrees of freedom, and/or a combination of hinges. The antenna 1600 can include one or more segments with one or more hinges such as those described above. The antenna 1600 can include one or more segments which allow the antenna 1600 to extend from a first length to a second length. For example, the antenna 1600 can be telescoping.

In some embodiments, transitioning of the antenna 1600 from a first configuration, such as the stowed configuration, to a second configuration, such as the deployed configuration, and/or from the second configuration to the first configuration can be performed manually by the user. In some embodiments, transitioning of the antenna 1600 from a first configuration to a second configuration and/or from a second configuration to a first configuration can be performed automatically. For example, the system on which the antenna 1600 is used can detect when the system is being worn by a user and/or when the antenna 1600 is in use. In systems which include an eyewear unit, the eyewear unit can include a proximity sensor and/or a strain sensor to detect when the eyewear unit is being worn by a user. Upon detecting that the system is being worn and/or that the antenna 1600 is in use, electromechanical components such as a solenoid or motor can transition the antenna 1600 from the first configuration to the second configuration. Upon detecting that the system is no longer being worn and/or that the antenna 1600 is no longer in use, electromechanical components can transition the antenna 1600 from the second configuration to the first configuration.

In some embodiments, the antenna 1600 can be stowed within an interior volume of a component of the system. For example, the antenna can be positioned within a front face or frame of an eyewear unit. In the first or stowed configuration, the antenna can be positioned within an interior volume of the front face or frame. In the second or deployed configuration, the antenna can be positioned exteriorly of the front face or frame, with the antenna extending anteriorly relative to the front face or frame. The antenna can extend generally longitudinally via telescoping action. In some embodiments, the antenna can be positioned behind a door in the stowed position such that the antenna is generally hidden when in the stowed position. The door can be rotated and/or translated towards an open position when the antenna is in the second or deployed configuration. While described in connection with the front face or frame, the antenna can be stowed within an interior volume any portion of an eyewear unit, modular unit, and/or remote unit as described above.

In some embodiments, the antenna can be stationary. In some embodiments, the antenna can be positioned radially or laterally outward of the component to which the antenna is attached. For example, the antenna can be positioned such that the distance between the antenna and the component to which it is attached is approximately the distance of a nosebridge region of an eyewear or a distance between two orbitals.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that such features, elements and/or steps are in any way required for one or more embodiments.

Moreover, the following terminology may have been used herein. The singular forms "a," "an," and "the" include plural referents unless the context clearly dictates otherwise. Thus, for example, reference to an item includes reference to one or more of such items. The term "ones" refers to one, two, or more, and generally applies to the selection of some or all of a quantity. The term "about," "approximately," or "similar" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The following is claimed:

1. A wearable electronic system comprising:
   an eyewear unit configured to be worn on a user's head, the eyewear unit comprising an input/output system including at least one wired connection, the eyewear unit further comprising one or more movable antennas, wherein at least one of the one or more movable antennas is configured to automatically transition from a first, stowed configuration to a second, deployed configuration when the wearable electronic system detects that the at least one of the one or more movable antennas is in use or that the wearable electronic system is being worn on the user's head, wherein at least one of the one or more movable antennas is located on an earstem of the eyewear unit, and wherein at least one of the one or more movable antennas is rotatable relative to a component to which the antenna is attached;
   a modular unit comprising an input/output system including at least one wired connection configured to removably couple to the at least one wired connection of the eyewear unit, and at least one wireless system comprising at least one of the following components:
   a receiver configured to wirelessly communicate with at least one remote unit;
   a transmitter configured to wirelessly communicate with the at least one remote unit; and
   a transceiver configured to wirelessly communicate with the at least one remote unit;
   wherein the input/output systems of the eyewear unit and the modular unit are configured to provide a wired electrical connection between the eyewear unit and the modular unit when in a coupled configuration via the at least one wired connection of the eyewear unit and the at least one wired connection of the modular unit, and wherein the wired connections are at least one of a port and connector.

2. The wearable electronic system of claim 1, wherein the at least one remote unit comprises an audio component, wherein the audio component is an in-ear speaker or an outwardly facing speaker, and wherein the at least one remote unit is an external speaker.

3. The wearable electronic system of claim 1, wherein the at least one remote unit comprises a smart phone.

4. The wearable electronic system of claim 1, wherein the modular unit comprises a sensor, wherein the sensor is an ambient or biometric sensor.

5. The wearable electronic system of claim 1, wherein the eyewear unit further comprises at least one of the following components:
   a processor;
   a memory;
   a sensor;
   a receiver configured to wirelessly communicate with the at least one remote unit;
   a transmitter configured to wirelessly communicate with the at least one remote unit; and
   a transceiver configured to wirelessly communicate with the at least one remote unit.

6. The wearable electronic system of claim 1, wherein the input/output system of the modular unit comprises a first wired connection and a second wired connection, where at least one of the first and second wired connections are configured to removably couple a second modular unit to the modular unit and to provide communication between the eyewear unit and the second modular unit.

7. The wearable electronic system of claim 1, wherein the eyewear unit comprises a power source configured to power the modular unit via the wired connections of the eyewear unit and the modular unit.

8. The wearable electronic system of claim 7, wherein the eyewear unit does not include a processor, a memory, a sensor, a receiver configured to wirelessly communicate with the at least one remote unit, a transmitter configured to wirelessly communicate with the at least one remote unit, or a transceiver configured to wirelessly communicate with the at least one remote unit.

9. The wearable electronic system of claim 1, wherein at least one of the modular unit and the eyewear unit further comprises a visual component configured to display an image to the user.

10. The wearable electronic system of claim 1, wherein the modular unit comprises an audio component configured to generate an audible signal perceptible by the user.

11. The wearable electronic system of claim 1, wherein the eyewear unit further comprises a haptic component configured to generate a tactile signal perceptible by the user, wherein the eyewear unit comprises a sensor, and wherein the haptic component is configured to provide the user with a tactile representation of data received from the sensor.

12. The wearable electronic system of claim 1, wherein the modular unit is configured to be attached to the eyewear unit proximate the user's head.

13. The wearable electronic system of claim 1, wherein the modular unit is configured to communicate with a first remote unit using a first wireless protocol, and the modular unit is configured to communicate with a second remote unit using a second wireless protocol, different from the first wireless protocol.

14. The wearable electronic system of claim 1, wherein in the deployed configuration, at least one of the one or more movable antennas can be positioned such that a distance between a user and the antenna is between one-third to two-thirds a length of the antenna.

15. The wearable electronic system of claim 1, wherein at least one of the one or more movable antennas is configured to automatically transition from the first configuration to the second configuration when the wearable electronic system detects that the at least one of the one or more movable antennas is in use.

16. A wearable electronic system comprising:
   an eyewear unit configured to be worn on a user's head, the eyewear unit comprising an input/output system including at least one wired connection, the eyewear unit further comprising one or more movable antennas, wherein at least one of the one or more movable antennas is configured to automatically transition from a first, stowed configuration to a second, deployed configuration when the wearable electronic system detects that the at least one of the one or more movable antennas is in use or that the wearable electronic system is being worn on the user's head, wherein at least one of the one or more movable antennas is located on an earstem of the eyewear unit, and wherein at least one of the one or more movable antennas is rotatable relative to a component to which the antenna is attached;
   a modular unit comprising an input/output system including at least one wired connection configured to removably couple to the at least one wired connection of the eyewear unit, and at least one wireless system comprising at least one of the following components:
   a receiver configured to wirelessly communicate with at least one remote unit;
   a transmitter configured to wirelessly communicate with the at least one remote unit; and
   a transceiver configured to wirelessly communicate with the at least one remote unit;
   wherein the at least one wired connection of the eyewear unit and the at least one wired connection of the modular unit are configured to provide a wired electrical connection between the eyewear unit and the modular unit when in a coupled configuration;
   wherein the input/output systems of the eyewear unit and the modular unit are configured to provide communication between the eyewear unit and the modular unit via the coupled wired connections of the eyewear unit and the modular unit, and
   wherein the wired connections are at least one of a port and connector.

17. The wearable electronic system of claim 16, wherein each of the eyewear unit and the modular unit further comprises at least one of the following components:
   a processor;
   a memory;
   a sensor;
   a receiver configured to wirelessly communicate with the at least one remote unit; and
   a transmitter configured to wirelessly communicate with the at least one remote unit.

18. The wearable electronic system of claim 17, wherein:
   the eyewear unit comprises the processor, and
   the modular unit comprises the receiver and the transmitter and is configured to serve as a node for wireless communication with multiple remote units.

19. The wearable electronic system according to claim 17, wherein:
   the modular unit comprises a sensor, and the eyewear unit comprises the receiver and the transmitter and is configured to serve as a node for wireless communication with multiple remote units.

20. The wearable electronic system of claim 1, wherein the modular unit is carried by the eyewear unit when the at least one wired connection of the modular unit is coupled to the at least one wired connection of the eyewear unit.

21. The wearable electronic system of claim 16, wherein the modular unit is carried by the eyewear unit when in the coupled configuration.

22. The wearable electronic system of claim 1, wherein at least one of the one or more movable antennas is configured to automatically transition from the first configuration to the second configuration when the wearable electronic system detects that the wearable electronic system is being worn on the user's head.

23. The wearable electronic system of claim 16, wherein at least one of the one or more movable antennas is configured to automatically transition from the first configuration to the second configuration when the wearable electronic system detects that the at least one of the one or more movable antennas is in use.

24. The wearable electronic system of claim 16, wherein at least one of the one or more movable antennas is configured to automatically transition from the first configuration to the second configuration when the wearable electronic system detects that the wearable electronic system is being worn on the user's head.

\* \* \* \* \*